United States Patent
Nicholson et al.

(10) Patent No.: US 11,499,024 B2
(45) Date of Patent: Nov. 15, 2022

(54) METHOD OF MANUFACTURING FOOD PACKAGING CELLULOSIC FILMS AND FOOD PACKAGING CELLULOSIC FILMS THUS PRODUCED

(71) Applicant: Viskase Companies, Inc., Lombard, IL (US)

(72) Inventors: Myron D. Nicholson, Lombard, IL (US); Francois Bargeot, Lombard, IL (US)

(73) Assignee: Viskase Companies, Inc., Lombard, IL (US)

( * ) Notice: Subject to any disclaimer, the term of this patent is extended or adjusted under 35 U.S.C. 154(b) by 509 days.

(21) Appl. No.: 16/339,181

(22) PCT Filed: Oct. 3, 2016

(86) PCT No.: PCT/US2016/055164
§ 371 (c)(1),
(2) Date: Apr. 3, 2019

(87) PCT Pub. No.: WO2018/067110
PCT Pub. Date: Apr. 12, 2018

(65) Prior Publication Data
US 2019/0313655 A1    Oct. 17, 2019

(51) Int. Cl.
*A22C 13/00* (2006.01)
*B29C 48/00* (2019.01)
(Continued)

(52) U.S. Cl.
CPC ............ *C08J 5/18* (2013.01); *A22C 13/0013* (2013.01); *B29C 48/022* (2019.02); *B29C 48/08* (2019.02);
(Continued)

(58) Field of Classification Search
CPC ........ A22C 2013/0096; B29K 2505/12; B29K 2001/00; B29K 2995/0008;
(Continued)

(56) References Cited

U.S. PATENT DOCUMENTS 2,179,181 A    11/1939  Charles et al.
2,949,371 A *  8/1960   Freund, II .......... A22C 13/0013
                                                              138/118.1
(Continued)

FOREIGN PATENT DOCUMENTS

DE    100 08 473      *  8/2001 ............. B32B 27/40
DE    10305580 A1       8/2004
(Continued)

OTHER PUBLICATIONS

Daoush, Walid M. "Co-Precipitation and Magnetic Properties of Magnetite Nanoparticles for Potential Biomedical Applications." Journal of Nanomedicine Research, vol. 5, No. 3, 2017, doi:10.15406/jnmr.2017.05.00118. (Year: 2017).*
(Continued)

*Primary Examiner* — Lee E Sanderson
*Assistant Examiner* — Michael C Romanowski
(74) *Attorney, Agent, or Firm* — TraskBritt

(57) ABSTRACT

The present invention relates to a method of manufacturing a cellulosic film (cellulose film), particularly a cellulosic food packing film, especially a detectable cellulosic film, which cellulosic film comprises detectable particles incorporated therein, as well as to the cellulosic film thus produced and to its applications and usages (i.e. its use).

24 Claims, 3 Drawing Sheets

(51) Int. Cl.

| | | |
|---|---|---|
| *B29C 48/08* | (2019.01) | |
| *C08J 5/18* | (2006.01) | |
| *C08J 7/048* | (2020.01) | |
| *B32B 23/14* | (2006.01) | |
| *B32B 23/18* | (2006.01) | |
| *B29K 1/00* | (2006.01) | |
| *B29K 505/12* | (2006.01) | |
| *B29K 509/00* | (2006.01) | |
| *B29L 31/00* | (2006.01) | |

(52) U.S. Cl.
CPC .............. *B32B 23/14* (2013.01); *B32B 23/18* (2013.01); *C08J 7/048* (2020.01); *A22C 2013/002* (2013.01); *A22C 2013/0036* (2013.01); *A22C 2013/0073* (2013.01); *A22C 2013/0096* (2013.01); *B29K 2001/00* (2013.01); *B29K 2505/12* (2013.01); *B29K 2509/00* (2013.01); *B29K 2995/0008* (2013.01); *B29L 2031/7129* (2013.01); *B32B 2264/102* (2013.01); *B32B 2264/30* (2020.08); *B32B 2439/70* (2013.01); *C08J 2301/02* (2013.01); *C08J 2301/06* (2013.01)

(58) Field of Classification Search
CPC ..... B32B 2439/70; B32B 23/14; B32B 23/16; B32B 23/18; B32B 1/08; C08K 2003/2272
USPC .................. 428/34.3, 34.8, 35.7, 34.1–36.92
See application file for complete search history.

(56) References Cited

U.S. PATENT DOCUMENTS

| | | | |
|---|---|---|---|
| 3,334,168 | A | 8/1967 | Henry et al. |
| 3,886,979 | A | 6/1975 | Rasmussen |
| 4,145,532 | A | 3/1979 | Franks et al. |
| 4,377,187 | A | 3/1983 | Chiu |
| 4,619,859 | A | 10/1986 | Yoshimura et al. |
| 4,731,400 | A | 3/1988 | Shigemoto |
| 4,756,914 | A | 7/1988 | Jon et al. |
| 5,277,857 | A | 1/1994 | Nicholson et al. |
| 5,549,943 | A | 8/1996 | Vicik |
| 6,171,668 | B1* | 1/2001 | Ocheltree .......... A22C 13/0013 426/138 |
| 6,177,113 | B1 | 1/2001 | Kress et al. |
| 6,547,999 | B1* | 4/2003 | Ducharme, Jr. ... A22C 13/0013 426/138 |
| 2003/0091764 | A1 | 5/2003 | Fujii et al. |
| 2004/0224174 | A1 | 11/2004 | Shoop et al. |
| 2004/0228952 | A1 | 11/2004 | Krallmann et al. |
| 2005/0106294 | A1 | 5/2005 | Stalberg et al. |
| 2006/0093715 | A1* | 5/2006 | Weidinger ................ A21B 3/13 426/512 |
| 2006/0094818 | A1* | 5/2006 | Weidinger .............. C08L 83/04 524/588 |
| 2007/0205529 | A1* | 9/2007 | May .......................... B03C 1/22 264/173.16 |
| 2008/0145576 | A1* | 6/2008 | Koenig .............. A22C 13/0013 428/34.8 |
| 2009/0000250 | A1 | 1/2009 | Nilsson et al. |
| 2010/0116010 | A1 | 5/2010 | Fechner et al. |
| 2010/0127207 | A1 | 5/2010 | Deetz |
| 2012/0228182 | A1 | 9/2012 | Ting et al. |
| 2013/0130000 | A1 | 5/2013 | Deetz |
| 2015/0083809 | A1 | 3/2015 | Wielockx et al. |
| 2015/0183965 | A1 | 7/2015 | Stucchi et al. |
| 2015/0328861 | A1 | 11/2015 | Koopmans et al. |
| 2019/0040226 | A1 | 2/2019 | Aga et al. |
| 2019/0135653 | A1 | 5/2019 | Aga et al. |

FOREIGN PATENT DOCUMENTS

| | | |
|---|---|---|
| DE | 202004007735 U1 | 3/2005 |
| DE | 202005021317 U1 | 11/2007 |
| EP | 0692194 A1 | 1/1996 |
| EP | 0577790 B1 | 1/1997 |
| EP | 1840168 A1 | 10/2007 |
| EP | 1892092 A1 | 2/2008 |
| EP | 2796048 A1 | 10/2014 |
| GB | 2452086 A | 2/2009 |
| JP | 2002-020554 A | 1/2002 |
| WO | 93/13670 A1 | 7/1993 |
| WO | 2006/042724 A2 | 4/2006 |
| WO | 2007/012898 A1 | 2/2007 |
| WO | 2011/123056 A1 | 10/2011 |
| WO | 2018/067110 A1 | 4/2018 |
| WO | 2018/067111 A1 | 4/2018 |

OTHER PUBLICATIONS

S. Sheng-Nan et al. "Magnetic iron oxide nanoparticles: synthesis and surface coating techniques for biomedical applications", Chin. Phys. B, vol. 23, No. 3 (2014), 037503-1 to 037503-19.

M. D. Nicholson "Flexible non-woven composites for food packaging", Tappi Journal, vol. 74, No. 5, May 1991, pp. 227 to 231.

International Written Opinion for International Application No. PCT/US2016/055164, dated Jun. 16, 2017, 7 pages.

International Search Report for International Application No. PCT/US2016/055164, dated Jun. 16, 2017, 4 pages.

Database WPI 00246 Thomson Scientific, London, GB; 19, AN 2002-429475 XP002770788 (2017).

A. Durdureanu-Angheluta et al. "Tailored and Functionalized Magnetite Particles for Biomedical and Industrial Applications", www.intechopen.com, pp. 149 to 178 (http://cdn.intechopen.com/pdfs/30356/InTech-Tailored_and_functionalized_magnetite_particles_for_biomedical_and_industrial_applications.pdf), Mar. 7, 2012.

Trantidou, T., Elani, Y., Parsons, E. et al. "Hydrophilic surface modification of PDMS for droplet microfluidics using a simple, quick, and robust method via PVA deposition." Microsyst Nanoeng 3, 16091 (2017). https://doi.org/10.1038/micronano.2016.91 (Year:2017).

Cornell, Rochelle M., and Udo Schwertmann. The Iron Oxides Structure, Properties, Reactions, Occurrences and Uses, 2nd Edition , Wiley-VCH, Weinheim, 2003, p. 123.) (Year: 2003).

Park et al., Hydrophobic Polydimethylsiloxane (PDMS) Coating of Mesoporous Silica and Its Use as a Preconcentrating Agent of Gas Analytes, Langmuir, 2014, vol. 30, p. 10256-10262, dx.doi.org/10.1021/la502915r (Year: 2014).

* cited by examiner

METHOD OF MANUFACTURING FOOD PACKAGING CELLULOSIC FILMS AND FOOD PACKAGING CELLULOSIC FILMS THUS PRODUCED

CROSS-REFERENCE TO RELATED APPLICATION

This application is a national phase entry under 35 U.S.C. § 371 of International Patent Application PCT/US2016/055164, filed Oct. 3, 2016, designating the United States of America and published in English as International Patent Publication WO 2018/067110 A1 on Apr. 12, 2018.

TECHNICAL FIELD

The present invention relates to the technical field of food packaging films, especially food packaging films on the basis of cellulose, particularly regenerated cellulose.

Especially, the present invention relates to a method of manufacturing a cellulosic film (i.e. cellulose film), particularly a cellulosic food packaging film, especially a detectable cellulosic film, which cellulosic film comprises detectable particles incorporated therein, and to the film thus obtained as well as to its respective applications and usages (i.e. its use).

Furthermore, the present invention relates to a foodstuff article packaged in a cellulosic film of the present invention.

Moreover, the present invention also relates to a medical device or article or a pharmaceutical packaged in a cellulosic film of the present invention.

Further, the present invention is also directed to a method of providing a cellulosic food packaging film with detection properties and/or detectability.

Finally, the present invention relates to the use of detectable particles for providing a cellulosic food packaging film with detection properties and/or detectability.

BACKGROUND

Films, especially artificial films including plastic (i.e. thermoplastic) films and also cellulosic films, particularly tubular films, are often used as food packaging and/or processing films, e.g. as sausage casings for processing and packaging sausages, including water or steam cooked sausages. Such films, especially in the form of casings or tubes, are also used to process and/or to package larger products, such as various types of deli cold cuts of meats e.g. made from chicken, beef and ham. Furthermore, artificial films including plastic (i.e. thermoplastic) films and also cellulosic films, especially in the form of bags, are also used for storing larger amounts of food ingredients to be further processed within a food production line (e.g. food powders, spices, extracts etc.).

One particularly typical food packaging film, especially casing, used in this respect is made from regenerated cellulose, wherein viscose may be extruded through an annular die into a coagulating and regenerating bath to produce a tube of regenerated cellulose; this is well known in the art. Usually, such tubes made from regenerated cellulose are subsequently washed, plasticized and may be impregnated with a water-soluble casing-permeable food flavorant or colorant, and then dried while inflated under substantial air pressure. After drying, the resulting cellulosic non-fibrous casing may be wound on reels and subsequently pleated or shirred, especially on high speed shirring machines. Non-fibrous casings are typically used to process small diameter sausages including Polish sausages, wieners or frankfurters and are generally removed from the sausages after processing. Non-fibrous cellulose casings may be reinforced by applying the viscose to a substrate such as paper or fabric, increasing the strength of the casing, which is a feature desired when producing the large-sized deli products.

Other types of casings are made from plastic (i.e. thermoplastic) films or tubes and may either be monolayered or multilayered. Thermoplastic films and casings are advantageous over cellulosic casings primarily for ease of production and lower costs to produce them. Production generally involves the melting of a respective plastic (i.e. thermoplastic) resin (such as e.g. a polyamide, a polyolefin etc.) and extruding it, usually through an appropriate die, to form a particular shape, and then heating, cooling and optionally stretching or orienting it during its formation into a film or a tube. No equipment is needed to handle wood chips and to dissolve and regenerate them, as in the manufacture of cellulose casings.

However, in many applications, such films or casings are applied for intermediate use only (e.g. during processing and/or production of the respective foodstuff), i.e. the films are not part of the final product which is determined for the end-user or the final customer.

Therefore, in these cases where such films are applied for intermediate use only, it is important to ensure that, in the final product, the film has been completely removed from the foodstuff and that no remaining parts of the film are to be found in the final product, which has been processed at least partially within a film (e.g. a casing or tube) beforehand.

In many countries, current food legislation requires the detectability of foreign objects in foodstuff, such as e.g. metal parts (e.g. originating from machine parts used in the food production). Such foreign objects, especially foreign objects of metal, can then be detected by metal detectors positioned in the production line of such foodstuff.

In this respect, DE 103 05 580 A1 and its U.S. equivalent US 2004/0228952 A1 disclose a tubular artificial sausage casing closed at one or two ends by a yarn having a metal insert, which yarn is thus detectable. When processing the sausages within these casings, it is ensured that parts of the closure yarn which might occasionally pass into the sausages due to failures in the production line can be easily detected via metal detectors. However, it is still disadvantageous that the sausage casings as such do not comprise any metal insert and are thus not detectable, so that occasional leftover pieces of casing remaining at the foodstuff surface or inside the foodstuff cannot be detected during processing or production of the foodstuff.

Furthermore, DE 20 2004 007 735 U1 (comparable to DE 103 05 580 A1) discloses a sausage casing tied with a yarn, wherein the yarn is made of fibers of a synthetic or natural material, into which metal filaments have been incorporated, so that the yarn used for closing the sausage casing is detectable, but not the casing as such.

Moreover, US 2015/0083809 A1 relates to an artificial food casing comprising a marking with a traceability code, wherein the marking comprises an ultraviolet-detectable component, especially on the inside or outside surface of the film. The ultraviolet-detectable component may be a pigment, a dye, an ink, a chemical compound or a fluorophore. However, the food casing comprising the UV-detectable component may only be detected during food processing or production if it is optically visible, i.e. if it is positioned at the outer side of the foodstuff surface. However, if e.g. pieces of the food casing, during processing or production, are incorporated into the inside of the foodstuff, such pieces of food casing are no longer detectable. Furthermore, UV-detection requires an additional and cost-intensive equipment for detection since in most foodstuff processing or production lines only metal detectors are used for the purpose of detection of metal parts, especially originating from machine parts.

Further, it is also known from the prior art to produce a laminar plastic film for use in food packaging and processing, which film comprises outer sheets of a plastic material (e.g. polyolefin material) and a core layer made of a metal sheet (e.g. aluminum), so as to obtain a three-layered film which might be detected by a metal detector. However, due to the presence of a metallic intermediate core layer disposed between the two outer layers of plastic material, the film as a whole loses the advantageous properties of a plastic film, especially processability, stretchability, mechanical resistance, breathability, permeability, smokability and the like.

Apart from food packaging films on the basis of plastics, also artificial food packaging films on the basis of cellulose (i.e. so-called regenerated cellulose) are highly appreciated due their favorable properties, such as e.g. tear and tensile strength, flavor sealing properties, transparency, environmental compatibility, However, in contrast to plastic materials (such as e.g. polyamides, polyolefins etc.), cellulose-based food packaging films cannot be produced by simple melt extrusion processes but rather by a complex multi-step chemical reaction cascade, mostly according to the so-called viscose process. Consequently, providing cellulose-based food packaging films with detection characteristics is significantly more complicated and complex than already in the case of plastic food packaging films.

Thus, in the prior art, there do not exist food packaging films which unify the advantageous properties of artificial food packaging films, on the one hand, and an efficient detectability of the whole films as such, especially via economic and easily available equipment, on the other hand.

What is needed in the packaging industry, especially food packaging industry, is therefore a packaging film on the basis of cellulose (preferably regenerated cellulose), especially a cellulosic food packaging film, which film is detectable or is provided with detection properties and/or detectability, especially with detection properties and/or detectability via a metal detection device (e.g. a metal detector) and/or via an induction-based and/or magnetism-based and/or conductivity-based detection device and/or via an optically based device and/or via a photodetection device.

Particularly, in view of the prior art described before, the problem underlying the present invention is especially to provide a detectable cellulose-based packaging film, especially a detectable cellulosic food packaging film, as well as a respective manufacturing method thereof, wherein the above-described disadvantages of the prior art are to be ameliorated or at least substantially avoided, respectively.

Especially, one particular problem addressed by the present invention is that of providing a detectable cellulose-based film, especially to be used as a food packaging film, which film is to unify the advantageous properties of cellulose-based films (such as e.g. tear and tensile strength, flavor sealing properties, transparency, environmental compatibility etc.), on the one hand, and an efficient detectability of the whole film as such, especially via economic and easily available equipment, on the other hand.

Particularly, such detectable cellulose-based film, especially detectable cellulose-based food packaging film, is to be detectable also in industrial and/or automated packaging and/or processing and/or production processes (such as e.g. food packaging and/or food processing and/or food production).

BRIEF SUMMARY

The present invention, according to a first aspect of the present invention, refers to a method of manufacturing a cellulosic film (cellulose film), particularly a cellulosic food packaging film, especially a detectable cellulosic film, which cellulosic film comprises detectable particles incorporated therein, such as the method(s) defined in the respective method claims herein.

Furthermore, according to a second aspect of the present invention, the present invention also relates to a cellulosic film (cellulose film), particularly a cellulosic food packaging film, especially a detectable cellulosic film, which cellulosic film comprises detectable particles incorporated therein, particularly in homogeneous distribution, such as the film(s) defined in the respective film claims herein.

Further, according to a third aspect of the present invention, the present invention also relates to the inventive use of the cellulosic film of the present invention, such as the film(s) defined in the respective film claims herein, for packaging and/or processing and/or producing foodstuff, such as the foodstuff article defined in the respective foodstuff article claim herein.

Also, according to a fourth aspect of the present invention, the present invention further relates to the inventive use of the cellulosic film of the present invention, such as the film(s) defined in the respective film claims herein, for enhancing and/or improving food safety and/or food security, especially in packaging and/or processing and/or producing foodstuff, such as the foodstuff article defined in the respective foodstuff article claim herein.

Furthermore, according to a fifth aspect of the present invention, the present invention also relates to the inventive use of the cellulosic film of the present invention, such as the film(s) defined in the respective film claims herein, for detecting undesired residues or remainders of the cellulosic film on foodstuff surfaces and/or within or inside foodstuff, such as the foodstuff article defined in the respective foodstuff article claim herein.

Further, according to a sixth aspect of the present invention the present invention also relates to the inventive use of the cellulosic film of the present invention, such as the film(s) defined in the respective film claims herein, for detecting undesired residues or remainders of the cellulosic film in industrial and/or automated packaging and/or processing and/or production processes.

Moreover, according to a seventh aspect of the present invention, the present invention also relates to the inventive use of the cellulosic film of the present invention, such as the film(s) defined in the respective film claims herein, for packaging and/or processing and/or producing medical devices and articles or pharmaceuticals.

Furthermore, according to an eighth aspect of the present invention, the present invention also relates to the inventive use of the cellulosic film of the present invention, such as the film(s) defined in the respective film claims herein, for enhancing and/or improving safety and/or security in packaging and/or processing and/or producing medical devices and articles or pharmaceuticals.

Also, according to a ninth aspect of the present invention, the present invention furthermore relates to a foodstuff article, such as the foodstuff article defined in the respective foodstuff article claim herein, packaged in a cellulosic film of the present invention, such as the film(s) defined in the respective film claims herein.

Moreover, according to a tenth aspect of the present invention, the present invention also relates to a medical device or article or a pharmaceutical packaged in a cellulosic film of the present invention, such as the film(s) defined in the respective film claims herein.

Further, according to a eleventh aspect of the present invention, the present invention also relates to a method of providing a cellulosic food packaging film, such as the film(s) defined in the respective film claims herein, with detection properties and/or detectability, especially with detection properties and/or detectability via a metal detection device, especially a metal detector, and/or via an induction-based and/or magnetism-based and/or conductivity-based detection device and/or via an optically based device and/or via a photodetection device.

Finally, according to a twelfth aspect of the present invention, the present invention also relates to the inventive use of detectable particles for providing a cellulosic food packaging film, such as the film(s) defined in the respective film claims herein, with detection properties and/or detectability, especially with detection properties and/or detectability via a metal detection device, especially a metal detector, and/or via an induction-based and/or magnetism-based and/or conductivity-based detection device and/or via an optically based device and/or via a photodetection device.

Before the present invention will be described more in detail hereinafter, the following general remarks are given:

It will be appreciated and it goes without saying that, in the following, any embodiments, particularities, advantages, explanations, indications, configurations and the like which are described or cited hereinafter for just one aspect of the present invention for the purpose of avoiding repetitions do, of course, also apply correspondingly and mutatis mutandis in relation to all other aspects of the present invention.

Furthermore, it will be appreciated that, in the case of any values, numbers, figures, ranges etc. indicated hereinafter, any ranges etc. stated should not be understood in a restrictive manner. It will be apparent to the person skilled in the art that, depending on the individual case and/or based on the respective application, it is possible to deviate from the stated ranges, figures, values etc., without leaving the scope of the present invention.

Moreover, any values, numbers, figures, ranges, parameters and the like indicated hereinafter may be determined or ascertained, in principle, by standardized or expressly specified determination methods or else by determination methods well known per se to those skilled in the art.

Furthermore, in relation to any hereinbelow recited relative or percentage-based indications, in particular weight-based amounts, it goes without saying that these indications are, in the context of the present invention, to be selected and/or to be combined by a person skilled in the art such that the resulting sum total—including where applicable any further components/ingredients—always comes to 100% or 100 wt. %, respectively.

Having stated this and with these provisions, the present invention will be described more in detail hereinafter.

BRIEF DESCRIPTION OF THE DRAWINGS

In the figures.

DETAILED DESCRIPTION

Figure 1:
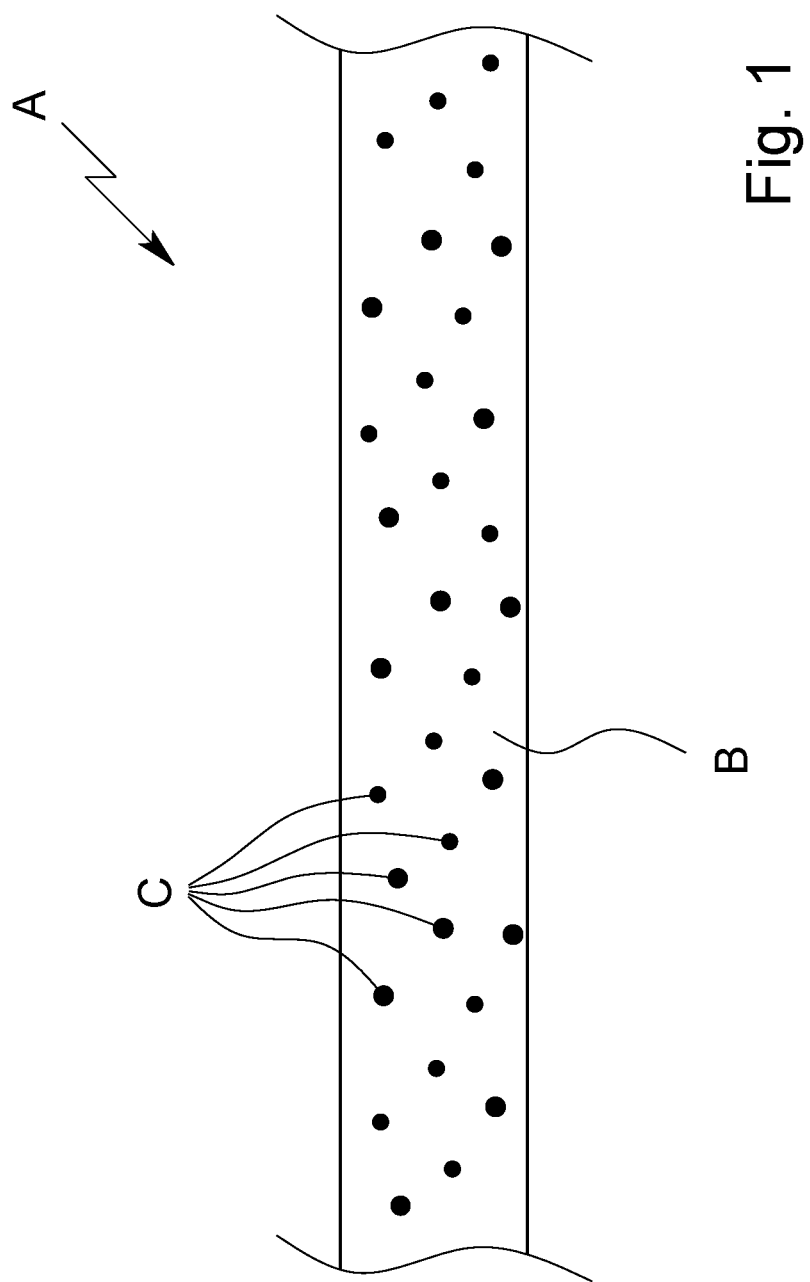
FIG. 1 shows a schematic cross-sectional view of an inventive cellulosic film (i.e. cellulose film), particularly a cellulosic food packaging film, comprising detectable particles incorporated therein according to a particular embodiment.

According to a first aspect of the present invention, the present invention refers to a method of manufacturing a cellulosic film (i.e. cellulose film), particularly a cellulosic food packaging film, especially a detectable cellulosic film, which cellulosic film comprises detectable particles incorporated therein, wherein the method comprises introducing and/or adding detectable particles into a solution or dispersion comprising cellulose and/or a cellulose precursor or derivative, followed by regenerating and/or recovering cellulose from the solution or dispersion in the presence of the detectable particles, so as to obtain a cellulosic film, particularly a cellulosic food packing film, comprising the detectable particles incorporated therein, particularly in homogeneous distribution.

Applicant has, completely surprisingly, found out that it is possible to provide a cellulosic film (i.e. cellulose film), particularly a cellulosic food packaging film, with detection properties and/or detectability by incorporating detectable particles therein if the detectable particles are introduced and/or added into a solution or dispersion comprising cellulose and/or a cellulose precursor or derivative, followed by regenerating and/or recovering cellulose from the solution or dispersion in the presence of the detectable particles.

In other words, applicant has surprisingly found out that it is possible to provide a detectable cellulosic film (i.e. cellulose film), particularly a detectable cellulosic food packaging film, and/or to incorporate detectable particles into a cellulosic film (i.e. cellulose film), particularly a cellulosic food packaging film, if the introduction and/or addition of the detectable particles takes place during the production process of the cellulosic film (i.e. cellulose film), namely without affecting the cellulose production process as such. In this respect, it is not only surprising that the addition of the detectable particles does not only not affect the cellulose film production nor the cellulose film quality as such but also that the detection and/or detectability properties of the detectable particles withstand the drastic conditions of the cellulose production process (e.g. pH values ranging from pH values of 14 during caustic treatment up to pH values of 1 during acidification for regeneration purposes).

It is thus absolutely unexpected that the addition of detectable particles within the complex multi-stage chemical cellulose film production process leaves the cellulose production process as well as the quality of the produced cellulosic film unaffected, on the one hand, and also does not influence the detectability of the detectable particles, on the other hand, so that by the inventive manufacturing method it is possible to obtain a detectable cellulosic film, particularly a detectable cellulosic food packing film, comprising the detectable particles incorporated therein, particularly in homogeneous distribution.

The method of the present invention is linked to a multitude of advantages and particularities, some of which are described in the following in a non-limiting way:

The present invention provides, for the first time, a cellulose-based film, particularly a packaging film on the basis of cellulose (preferably regenerated cellulose), especially a cellulosic food packaging film, which film is detectable or is provided with detection properties and/or detectability, especially with detection properties and/or detectability via a metal detection device (e.g. a metal detector) and/or via an induction-based and/or magnetism-based and/or conductivity-based detection device and/or via an optically based device and/or via a photodetection device.

Particularly, by the present invention, there is provided, for the first time, a detectable cellulose-based packaging film, especially a detectable cellulosic food packaging film, which film unifies the advantageous properties of cellulose-based films (such as e.g. tear and tensile strength, flavor sealing properties, transparency, environmental compatibility, (semi-)permeability, breathability, smokability etc.), on the one hand, and an efficient detectability of the whole film as such, especially via economic and easily available equipment, on the other hand.

Since conventional industrial food production lines are typically equipped with metal detecting systems anyway, usually no additional detecting equipment is required, i.e. the inventive detectable cellulose-based packaging film may be easily detected by conventional detecting systems usually already installed in industrial food production lines anyway.

Due to the homogeneous distribution of the detectable particles incorporated in the inventive cellulosic food packing film and also due to the possibility of incorporating high amounts or concentrations of the detectable particles via the inventive manufacturing method, even very small pieces of the inventive cellulosic food packing film can be easily detected even in industrial and/or automated packaging and/or processing and/or production processes (e.g. even small film pieces of 0.5 cm×0.5 cm size or even smaller).

Especially, the inventive detectable cellulose-based film, particularly detectable cellulose-based food packaging film, is even detectable in industrial and/or automated packaging and/or processing and/or production processes (such as e.g. food packaging and/or food processing and/or food production).

Due to the fact that the detectable particles are permanently and safely incorporated (with)in and/or fixed (with)in and/or immobilized with(in) the inventive cellulosic film, there is no danger that the detectable particles may be set free or may be transferred to a foodstuff packaged therein, not even under drastic conditions, such as processing foodstuff by e.g. cooking, boiling, heating, smoking, peeling and unpeeling, cutting, slicing etc. Furthermore, even under such drastic conditions, the detectable particles are not affected in their detectability since they are protected and immobilized by the cellulose-based matrix of the inventive film into which the detectable particles are embedded and immobilized.

Furthermore, the inventive detectable cellulose-based film, especially detectable cellulose-based food packaging film, is based on an environmentally friendly and biodegradable material of natural origin (i.e. cellulose, especially regenerated cellulose) and is therefore non-toxic and thus food-compatible and possesses excellent food processing and packaging properties (particularly, above all, excellent mechanical, physicochemical and optical properties, such as e.g. excellent tear and tensile strength, high strength to breakage, excellent flavor sealing properties, high permeability to water vapor and smoke, excellent barrier properties to microorganisms and oxygen, good absorption and/or adsorption properties e.g. as to food flavorants and colorants, good transparency etc.) and are, at the same time, detectable even in industrial and/or automated packaging and/or processing and/or production processes.

Thus, the present invention provides an efficient, economic and reliable method of manufacturing a cellulosic film (i.e. cellulose film), particularly a cellulosic food packaging film, especially a detectable cellulosic film, which cellulosic film comprises detectable particles incorporated therein, particularly in homogeneous distribution.

As delineated before, the inventive method comprises introducing and/or adding detectable particles into a solution or dispersion comprising cellulose and/or a cellulose precursor or derivative, followed by regenerating and/or recovering cellulose from the solution or dispersion in the presence of the detectable particles, so as to obtain a cellulosic film, particularly a cellulosic food packing film, comprising the detectable particles incorporated therein, particularly in homogeneous distribution.

According to a typical embodiment, the detectable particles are introduced into the solution or dispersion comprising cellulose and/or a cellulose precursor or derivative in the presence of at least one dispersant (dispersing agent). The presence of at least one dispersant (dispersing agent) has the advantage that the detectable particles form a more homogeneous and/or more stable dispersion, so that the presence of at least one dispersant (dispersing agent) allows for a more homogeneous distribution of the detectable particles in the final product. Furthermore, the dispersant (dispersing agent) also ensures an improved processability.

According to a particular embodiment, the dispersant (dispersing agent) may be a surface-active detergent or a surface-active polymer.

Particularly, the dispersant (dispersing agent) may be a surface-active polymer having a number-average molecular weight of at least 500 g/mol, preferably at least 1,000 g/mol, more preferably at least 2,000 g/mol, and/or having a number number-average molecular weight of up to 10,000,000 g/mol, preferably of up to 1,000,000 g/mol, more preferably of up to 100,000 g/mol.

According to a preferred embodiment, the dispersant (dispersing agent) is a surface-active polymer comprising functional groups and/or groups with pigment affinity, especially acid-functional groups, preferably sulfonic acid-functional groups.

According to another preferred embodiment of the present invention, the dispersant (dispersing agent) may be selected from the group consisting of condensed arylsulfonic acids, especially neutral salts of condensed arylsulfonic acids, preferably condensed naphthalenesulfonic acids, more preferably neutral salts of condensed naphthalenesulfonic acids.

Especially, the dispersant (dispersing agent) may be selected from the group consisting of arylsulfonic acids-formaldehyde condensates, especially neutral salts of arylsulfonic acids-formaldehyde condensates, preferably naphthalenesulfonic acids-formaldehyde condensates, more preferably neutral salts of naphthalenesulfonic acids-formaldehyde condensates.

Particularly, the dispersant (dispersing agent) may be a polymeric dispersant based on a naphthalene condensate or its neutral salts, preferably a condensed naphthalenesulfonic acid condensate or its neutral salts, more preferably a naphthalenesulfonic acid-formaldehyde condensate or its neutral salts.

Another preferred dispersant (dispersing agent) is a hydrophobic copolymer polyelectrolyte, particularly a maleic anhydride copolymer or its salts.

According to a particular embodiment, the dispersant (dispersing agent) is a food-compatible dispersant (dispersing agent).

Particularly good results are obtained if the dispersant (dispersing agent) is used in amounts, calculated as the weight ratio of detectable particles:dispersant (dispersing agent), in the range of from 2,000:1 to 1:1, especially 1,000:1 to 5:1, preferably 500:1 to 10:1, more preferably 250:1 to 15:1, even more preferably 100:1 to 20:1.

According to a particular embodiment of the inventive manufacturing method, the detectable particles may be introduced into the solution or dispersion comprising cellulose and/or a cellulose precursor or derivative in the presence of at least one rheology modifier, especially viscosifier, particularly thickener (thickening agent).

According to this particular embodiment, the dispersion of the detectable particles is provided with an enhanced stability and/or is stabilized. Especially, the presence of at least one rheology modifier, especially viscosifier, particularly thickener (thickening agent), prevents the detectable particles from depositing and thus leads to a more homogeneous distribution of the detectable particles.

According to a particular embodiment, the rheology modifier, especially viscosifier, particularly thickener (thickening agent), may be selected from the group consisting of (i) cellulose and cellulose derivatives such as cellulose esters and cellulose ethers, especially selected from the group consisting of carboxymethyl cellulose (CMC), methyl ethyl cellulose, hydroxypropyl methyl cellulose, hydroxypropyl cellulose, methyl cellulose, ethyl cellulose, cellulose powder and microcrystalline cellulose as well as mixtures and combinations thereof, preferably carboxymethyl cellulose (CMC); (ii) organic polymers, especially selected from the group consisting of polyvinyl alcohols, polyacrylic acids and their salts, polyacrylates, polymethacrylic acids and their salts, polymethacrylates, polyacrylamides, polyvinylpyrrolidones and polyalkylene glycols, especially polyethylene glycols and polypropylene glycols, as well as mixtures and combinations thereof; (iii) alginic acids and their salts, ethers and esters, especially alginates; (iv) agar (agar-agar); (v) carrageenans; (vi) ceratonia siliqua gums (locust bean gums); (vii) galactomannans, especially guar gums (guarans); (viii) tragacanth gums; (ix) gum Arabic; (x) xanthan gums; (xi) gellan gums; (xii) polysaccharides and polysaccharide derivatives such as polysaccharide esters and polysaccharide ethers, especially starch and starch derivatives such as starch polymers, starch esters and starch ethers, preferably hydroxypropyl starch; as well as mixtures and combinations thereof; preferably carboxymethyl cellulose (CMC).

According to a preferred embodiment of the inventive method, the rheology modifier, especially viscosifier, particularly thickener (thickening agent), may be a cellulose derivative such as a cellulose ester or a cellulose ether, especially selected from the group consisting of carboxymethyl cellulose (CMC), methyl ethyl cellulose, hydroxypropyl methyl cellulose, hydroxypropyl cellulose, methyl cellulose, ethyl cellulose, cellulose powder and microcrystalline cellulose as well as mixtures and combinations thereof, preferably carboxymethyl cellulose (CMC). Carboxymethyl cellulose (CMS) is particularly preferred as a rheology modifier used in the invention.

According to a typical embodiment of the inventive manufacturing method, the rheology modifier, especially viscosifier, particularly thickener (thickening agent), is a food-compatible rheology modifier, especially viscosifier, particularly thickener (thickening agent).

According to the present invention, it is preferred if the rheology modifier, especially viscosifier, particularly thickener (thickening agent), is used in amounts, calculated as the weight ratio of detectable particles:rheology modifier, in the range of from 1,000:1 to 1:1, especially 500:1 to 5:1, preferably 250:1 to 10:1, more preferably 100:1 to 20:1.

According to yet another particular embodiment of the inventive manufacturing method, the detectable particles may be introduced into the solution or dispersion comprising cellulose and/or a cellulose precursor or derivative in the presence of at least one additive or ingredient, especially selected from the group consisting of disinfectants, fungistatic or fungicidal agents, bacteriostatic or bactericidal agents, pH stabilizing agents, buffering agents, colorants, flavorants, pigments, fillers, organic or alcohol-based solvents, lubricants, antioxidants, stabilizing agents, UV stabilizers and combinations thereof.

According to a preferred embodiment of the present invention, the detectable particles are introduced and/or added in the form of a dispersion, especially slurry. This specific embodiment leads to a particularly homogeneous distribution of the detectable particles and allows for an easy addition or introduction during the production process of the cellulosic film. According to this embodiment, the detectable particles may form a dispersion in an appropriate dispersion medium, particularly selected from the group consisting of water, alcohols and organic solvents as well as mixtures and combinations thereof, preferably water. According to a preferred embodiment, the detectable particles may form an aqueous dispersion. This preferred embodiment is particularly compatible with the production process.

Usually, when the detectable particles are introduced and/or added in the form of a dispersion, especially slurry, the dispersion may comprise the detectable particles in amounts of from 0.5 to 80 wt. %, particularly 1 to 70 wt. %, preferably 3 to 60 wt. %, more preferably 5 to 50 wt. %, even more preferably 10 to 40 wt. %, most preferably 15 to 30 wt. %, based on the dispersion.

When the detectable particles are introduced and/or added in the form of a dispersion, the dispersion may further comprise at least one dispersant (dispersing agent), especially as defined hereinbefore and/or especially in amounts of from 0.001 to 15 wt. %, particularly 0.01 to 10 wt. %, preferably 0.05 to 5 wt. %, more preferably 0.1 to 4 wt. %, even more preferably 0.2 to 3 wt. %, most preferably 0.5 to 2 wt. %, based on the dispersion.

When the detectable particles are introduced and/or added in the form of a dispersion, especially a slurry, the dispersion may further comprise at least one rheology modifier, especially viscosifier, particularly thickener (thickening agent), especially as defined hereinbefore and/or especially in amounts of from 0.0001 to 10 wt. %, particularly 0.001 to 6 wt. %, preferably 0.01 to 5 wt. %, more preferably 0.05 to 3 wt. %, even more preferably 0.1 to 2 wt. %, most preferably 0.1 to 1 wt. %, based on the dispersion.

With respect to the detectable particles used in the inventive manufacturing method, it is preferred if the detectable particles are magnetic, especially permanently magnetic, preferably ferromagnetic, ferrimagnetic or (super)paramagnetic.

The detectable particles used in the inventive manufacturing method may comprise or consist of at least one metal or metal oxide, especially iron (Fe) and/or cobalt (Co) and/or nickel (Ni) and/or their oxide(s), preferably oxide(s) of iron (Fe) and/or cobalt (Co) and/or nickel (Ni), more preferably oxide(s) of iron (Fe), especially in magnetic form.

Particularly, the detectable particles used in the present invention may comprise or consist of at least one magnetic metal or metal oxide, especially iron (Fe) and/or cobalt (Co) and/or nickel (Ni) and/or their oxide(s), preferably oxide(s) of iron (Fe) and/or cobalt (Co) and/or nickel (Ni), more preferably oxide(s) of iron (Fe).

According to the present invention, it is preferred if the detectable particles comprise or consist of at least one magnetic iron oxide, especially selected from the group consisting of magnetite ($Fe_3O_4$), maghemite ($Fe_2O_3$), hematite ($Fe_2O_3$), ferrite, goethite (FeO(OH)), lepidocrocite (FeO(OH)) and ferroxyhyte (FeO(OH)) as well as mixtures and combinations thereof, preferably magnetite ($Fe_3O_4$).

Particularly good results are reached if the detectable particles comprise iron (Fe) in weight-related amounts in the range of from 20 to 80 wt. %, especially 25 to 75 wt. %, based on the overall particle weight.

For the purpose of good detectability results, it is preferred if the detectable particles comprise a weight-related specific saturation magnetization of at least 50 $Am^2$/kg iron (Fe), especially at least 70 $Am^2$/kg iron (Fe), particularly at least 80 $Am^2$/kg iron (Fe), preferably at least 90 $Am^2$/kg iron (Fe), more preferably at least 100 $Am^2$/kg iron (Fe), even more preferably at least 110 $Am^2$/kg iron (Fe).

The particle sizes of the detectable particles used in the present invention may vary within broad ranges:

According to a specific embodiment, the detectable particles may comprise absolute particle sizes, especially absolute particle diameters, in the range of from 0.01 to 1,000 micrometers, especially 0.05 to 750 micrometers, particularly 0.1 to 500 micrometers, preferably 0.2 to 400 micrometers, more preferably 0.2 to 300 micrometers, even more preferably 0.5 to 200 micrometers, most preferably 1 to 100 micrometers, especially determined via light scattering and/or laser diffraction, preferably according to standardized method pursuant to ISO 13320:2009.

According to another particular embodiment, the detectable particles may comprise mean (average) particle sizes D50, especially mean (average) particle diameters D50, in the range of from 0.05 to 500 micrometers, especially 0.1 to 250 micrometers, particularly 0.2 to 150 micrometers, preferably 0.5 to 100 micrometers, more preferably 0.8 to 75 micrometers, even more preferably 1 to 50 micrometers, most preferably 2 to 30 micrometers, especially determined via light scattering and/or laser diffraction, preferably according to standardized method pursuant to ISO 13320: 2009.

According to yet another particular embodiment of the present invention, the detectable particles may comprise mean (average) particle sizes D100, especially mean (average) particle diameters D100, in the range of from 0.1 to 800 micrometers, especially 0.2 to 400 micrometers, particularly 0.5 to 200 micrometers, preferably 1 to 150 micrometers, more preferably 2 to 125 micrometers, even more preferably 3 to 110 micrometers, most preferably 5 to 100 micrometers, especially determined via light scattering and/or laser diffraction, preferably according to standardized method pursuant to ISO 13320:2009-10.

With respect to the detectable particles used in the inventive manufacturing method, the detectable particles may comprise a density in the range of from 2 to 10 $g/cm^3$, especially 2.5 to 8 $g/cm^3$, particularly 3 to 7 $g/cm^3$, preferably 4 to 6 $g/cm^3$, more preferably 4.5 to 5.5 $g/cm^3$, preferably as determined according to standardized method pursuant to DIN EN ISO 1183-1:2013-04.

Furthermore, the detectable particles may usually comprise an apparent density (bulk density) in the range of from 1 to 8 $g/cm^3$, especially 1.2 to 5 $g/cm^3$, particularly 1.3 to 4 $g/cm^3$, preferably 1.5 to 3 $g/cm^3$, preferably as determined according to standardized method pursuant to DIN EN ISO 60-1:2000-01.

Furthermore, the detectable particles and/or the cellulosic film comprising the detectable particles incorporated therein is/are usually detectable by a metal detection device, especially a metal detector, and/or by an induction-based and/or magnetism-based and/or conductivity-based detection device and/or by an optically based device and/or by a photodetection device.

According to a preferred embodiment of the present invention, the detectable particles used in the present invention may comprise a surface-modification, preferably protective against oxygen and/or against oxidation, especially an antioxidant and/or protective surface coating or surface encapsulation. This specific embodiment of the present invention is particularly preferred since it preserves the properties of the used detectable particles, especially the detection properties, even under the drastic conditions of the cellulose film production.

Such detectable particles comprising a surface-modification, preferably protective against oxygen and/or against oxidation, are commercially available. Furthermore, it is well-known to the skilled practitioner to provide detectable particles with such surface-modification, e.g. by contacting the surface of the detectable particles with respective surface-modifying chemicals (e.g. polysilanes, polysiloxanes, polyacrylates, polymethacrylates, polyacrylamides, starch-based polymers, cellulose-based polymers, polysaccharides, polyaminosaccharides, biopolymers etc.) or e.g. by co-precipitation methods (i.e. precipitation of detectable particles in the presence of the respective surface-modifying chemicals).

For further details as to the surface-modification of the detectable particles, reference may be made, e.g., to document WO 2006/042724 A2, which document is hereby fully incorporated by reference. Furthermore, as to the surface-modification of the detectable particles, particularly with respect to the surface-modification of magnetic iron oxide particles, reference can also be made to the following documents, which documents are hereby also fully incorporated by reference: S. Sheng-Nan et al. "Magnetic iron oxide nanoparticles: synthesis and surface coating techniques for biomedical applications", Chin. Phys. B, Vol. 23, No. 3 (2014), 037503-1 to 037503-19; A. Durdureanu-Angheluta et al. "Tailored and Functionalized Magnetite Particles for Biomedical and Industrial Applications", www.intechopen.com, pages 149 to 178 (http://cdn.intechopen.com/pdfs/30356/InTech-Tailored_and_functionalized_magnetite_particles_for_biomedical_and_industrial_applications.pdf).

According to the specific embodiment, according to which the detectable particles may comprise a surface-modification, it is preferred if the surface-modification is hydrophobic.

According to a preferred embodiment, the surface-modification is bonded, especially chemically bonded, preferably covalently bonded, to the particle surfaces. This leads to the advantage that the surface-modification is preserved even under drastic reaction conditions.

According to a particular embodiment of the present invention, the surface-modification of the detectable particles may comprise or consist of inorganic, organic or inorganic-organic polymers, especially selected from the group consisting of polysilanes, polysiloxanes, polyacrylates, polymethacrylates, polyacrylamides, starch-based polymers, cellulose-based polymers, polysaccharides, polyaminosaccharides and biopolymers as well as mixtures and combinations thereof, preferably polysilanes and polysiloxanes.

The amounts or concentrations of detectable particles used in the inventive manufacturing method may vary within broad ranges. However, amounts or concentrations of detectable particles should be selected such that the resulting film as a whole as well as pieces thereof are detectable under relevant conditions.

Typically, it is preferred if the detectable particles are used, especially introduced and/or added, in such amounts that the resulting cellulosic film comprising the detectable particles incorporated therein comprises 0.1 to 50 wt. %, especially 0.2 to 40 wt. %, particularly 0.3 to 30 wt. %, preferably 0.5 to 20 wt. %, more preferably 0.8 to 10 wt. %, even more preferably 1 to 8 wt. %, of the detectable particles, based on the overall weight of the cellulosic film comprising the detectable particles incorporated therein.

Usually, the resulting inventive cellulosic film comprising the detectable particles incorporated therein may comprise 0.1 to 50 wt. %, especially 0.2 to 40 wt. %, particularly 0.3 to 30 wt. %, preferably 0.5 to 20 wt. %, more preferably 0.8 to 10 wt. %, even more preferably 1 to 8 wt. %, of the detectable particles, based on the overall cellulosic film weight.

According to a typical embodiment of the present invention, the detectable particles are homogeneously distributed over and/or are homogeneously incorporated in the cellulosic film obtained.

In order words, the cellulosic film comprising the detectable particles incorporated therein comprises the detectable particles in homogeneous distribution. Particularly, the resulting cellulosic film should comprise the detectable particles incorporated therein in homogeneous distribution. Thus, it is ensured that equal detection properties of the whole film are reached.

As delineated hereinbefore, the detectable particles are permanently incorporated in and/or fixed (with)in and/or immobilized with(in) the cellulosic film comprising the detectable particles incorporated therein. Thus, it is ensured that the particles may not be transferred to the foodstuff during processing and/or packaging.

Usually, the inventive manufacturing method further comprises adding at least one plasticizer to the cellulosic film, especially during or after regeneration and/or recovery of the cellulose. Especially, the plasticizer may be used, especially added, in such amounts that the resulting cellulosic film comprises 0.5 to 40 wt. %, especially 1 to 30 wt. %, particularly 2 to 25 wt. %, preferably 3 to 20 wt. %, more preferably 5 to 15 wt. %, of the plasticizer, based on the overall weight of the cellulosic film comprising the detectable particles incorporated therein. Especially, the cellulosic film comprising the detectable particles incorporated therein may comprise 0.5 to 40 wt. %, especially 1 to 30 wt. %, particularly 2 to 25 wt. %, preferably 3 to 20 wt. %, more preferably 5 to 15 wt. %, of the plasticizer, based on the overall cellulosic film weight. Especially, the plasticizer may be a food-compatible plasticizer. According to a particularly preferred embodiment, the plasticizer may be selected from the group consisting of polyols, especially glycerol (glycerine).

According to a particular embodiment of the present invention, the regeneration and/or recovery of the cellulose is performed by precipitating cellulose from the cellulose comprising solution or by converting and/or reacting the cellulose precursor or derivative to cellulose, especially to regenerated cellulose or cellulose hydrate (cellophane).

According to a particular embodiment of the present invention, the regeneration and/or recovery of the cellulose is performed by precipitating cellulose from the cellulose comprising solution. Especially, according to this embodiment, the cellulose comprising solution may be a solution of cellulose in a solvent based on a preferably aqueous aminoxide, especially N-methylmorpholine-N-oxide (NMNO). Particularly, the precipitation of cellulose from the cellulose comprising solution is performed by adding water to the solution and/or by contacting the solution with water.

Alternatively, according to another particular embodiment of the present invention, the cellulose film production is performed according to the so-called viscose process. According to this embodiment, the regeneration and/or recovery of the cellulose is performed by converting and/or reacting the cellulose precursor or derivative to cellulose, especially to regenerated cellulose or cellulose hydrate (cellophane). Especially, the cellulose precursor or derivative may be a cellulose xanthate, especially a cellulose xanthate in a caustic solution. Particularly, the cellulose xanthate may be obtained from a natural cellulose source which is treated with a caustic solution, optionally followed by shredding and ageing, wherein the resulting alkali cellulose optionally shredded and aged is then reacted with carbon disulfide ($CS_2$), so as to obtain a cellulose xanthate, especially a cellulose xanthate in a caustic solution. Especially, according to this specific embodiment, the cellulose precursor or derivative, especially a cellulose xanthate, is converted and/or reacted to cellulose by adding at least one acidic compound, especially at least one mineral or inorganic acid, preferably sulfuric acid, and/or by contacting the cellulose precursor or derivative, especially a cellulose xanthate, with at least one mineral or inorganic acid, preferably sulfuric acid.

According to a preferred embodiment, the cellulose film production is performed according to the so-called "viscose process", which has been briefly described before and which is well-known to the skilled practitioner:

According to the so-called "viscose process", viscose (i.e. a soluble cellulose derivative) is extruded as a tubular film through an annular die into coagulating and regenerating baths to produce a tube of regenerated cellulose. Usually, the tube is subsequently washed, plasticized with glycerine or another polyol and dried, wherein drying is usually accomplished while the tube is inflated with air at a pressure sufficient both to maintain a constant tube diameter and to orient (stretch) the film.

The viscose process for making cellulose is well-known in the art: Briefly, in the viscose process, a natural cellulose, such as e.g. wood pulp or cotton linters, is treated with a caustic solution to activate the cellulose to permit derivatization and extract certain alkali soluble fractions from the natural cellulose. The resulting alkali cellulose is shredded, aged and treated with carbon disulfide carbon to form cellulose xanthate, which is a cellulose derivative. The cellulose xanthate is dissolved in a weak caustic solution. The resulting solution or "viscose" is ripened, filtered, deaerated and extruded. The pulp source and time of aging the alkali cellulose are selected depending upon whether the viscose will be used to make fibrous reinforced or non-reinforced cellulose casings. The viscose is extruded as a tube through an annular die and about a self-centering mandrel into coagulation and regeneration baths containing salts and sulfuric acid. In the acidic baths, the cellulose xanthate is converted back to cellulose (i.e. regenerated cellulose). In this respect, the acidic bath decomposes the cellulose xanthate with the result that a pure form of cellulose is coagulated and regenerated.

For further details with respect to the viscose process, reference may be made, for example, to the following references, which are hereby fully incorporated by reference with their whole respective contents: EP 0 692 194 A1, U.S. Pat. Nos. 4,377,187 A, 4,756,914 A, 5,277,857 A, WO 93/13670 A1, EP 0 577 790 B1, U.S. Pat. Nos. 4,145,532 A, 2,179,181 A and 3,886,979 A; M. D. Nicholson "Flexible non-woven composites for food packaging", Tappi Journal, Vol. 74, No. 5, May 1991, pages 227 to 231; Endel Karmas "Sausage Casing Technology", Noyes Data Corporation, 1974, page 150 to 153.

Usually, according to the inventive method, the regeneration and/or recovery of the cellulose may be combined with an extrusion and/or extrusion step, particularly in order to form a film, especially a flat or tubular film, preferably a tubular film.

According to a typical embodiment of the inventive manufacturing method, the slurry resulting from introducing and/or adding the detectable particles into the solution or dispersion comprising cellulose and/or a cellulose precursor or derivative may be subjected to an extrusion process, especially during or combined with the regeneration and/or recovery of the cellulose, particularly wherein the slurry may be extruded into at least one regeneration bath comprising the chemical required to regenerate and/or recover the cellulose, especially to precipitate the cellulose or to convert and/or react the cellulose precursor or derivative to cellulose, especially to regenerated cellulose or cellulose hydrate (cellophane).

According to this embodiment, the slurry comprising the cellulose and/or the cellulose precursor or derivative and the detectable particles may be subjected to an extrusion process, especially during or combined with the regeneration and/or recovery of the cellulose, particularly wherein the slurry may be extruded into at least one regeneration bath comprising the chemical required to regenerate and/or recover the cellulose, especially to precipitate the cellulose or to convert and/or react the cellulose precursor or derivative to cellulose, especially regenerated cellulose or cellulose hydrate (cellophane).

The extrusion and/or extrusion step is performed using an extrusion die, especially an annular die.

According to a particular embodiment of the present invention, the extrusion and/or extrusion step may be followed by and/or combined with an inflation step, especially for orienting (stretching) the film and/or for maintaining a constant diameter of the extruded tube, especially wherein inflation may be performed with air, especially pressurized air, and/or especially wherein inflation may be combined with or followed by a drying step.

The extrusion and/or extrusion step may be combined with a paper web. The film may be reinforced and/or supported, especially by a preferably fibrous substrate, particularly a paper, a web or a fabric. The cellulosic film may be bonded, preferably by extrusion, to a fibrous substrate, particularly to a paper, a web or a fabric, so as to obtain a reinforced and/or supported, preferably fiber-reinforced or fibrous reinforced cellulosic film comprising the detectable particles incorporated therein.

According to a particular embodiment, the extrusion and/or extrusion step may be performed as a co-extrusion process, wherein the cellulosic film comprising the detectable particles incorporated therein is co-extruded and/or combined with at least one other film of same or different material, particularly so as to obtain a detectable cellulosic film comprising detectable particles incorporated therein and to which at least one other film has been co-extruded on at least one of its both sides.

According to another particular embodiment, after extrusion and/or extrusion step, the extruded cellulosic film comprising the detectable particles incorporated therein may be laminated and/or combined with at least one other film of same or different material on at least one of its both sides, particularly so as to obtain a detectable cellulosic film comprising detectable particles incorporated therein and to which at least one other film has been provided and/or adhered and/or laminated on at least one of its both sides.

In order to modify certain film properties, according to a particular embodiment of the present invention, it is possible that the cellulosic film comprising the detectable particles incorporated therein may be provided, on at least one of its both sides, with a film or coating having moisture and/or oxygen barrier properties, especially with a polyvinylidene chloride (PVDC) film or coating.

According to a specific embodiment of the present invention, the cellulosic film comprising the detectable particles incorporated therein may be provided, on at least one of its both sides, with at least one food additive. Especially, the at least one food additive may comprise a flavoring and/or coloring and/or odoring food additive, especially in the form of a preferably aqueous solution or dispersion, particularly a liquid smoke or caramel.

According to a specific embodiment of the present invention, there is provided a method of manufacturing a cellulosic film (i.e. cellulose film), particularly a cellulosic food packing film, especially a detectable cellulosic film, which cellulosic film comprises detectable particles incorporated therein, especially as defined hereinabove, wherein the method comprises the following steps:

(a) providing a natural cellulose source, especially in the form of a wood pulp or cotton linters: then (b) treating the natural cellulose source of step (a) with a caustic solution, optionally followed by shredding and ageing, so as to result in an alkali cellulose optionally shredded and aged; then (c) reacting the alkali cellulose obtained in step (b) with carbon disulfide ($CS_2$) so as to obtain a cellulose xanthate, especially a cellulose xanthate in a caustic solution; then (d) introducing and/or adding detectable particles to the cellulose xanthate, especially the caustic solution of the cellulose xanthate, obtained in step (c), particularly so as to obtain a slurry comprising the cellulose xanthate, especially the caustic solution of the cellulose xanthate, and the detectable particles; then (e) regenerating and/or recovering cellulose from the cellulose xanthate, especially the caustic solution of the cellulose xanthate, in the presence of the detectable particles, especially from the slurry obtained in step (d), so as to obtain a cellulosic film, particularly a cellulosic food packing film, comprising the detectable particles incorporated therein, particularly in homogeneous distribution.

Regenerating and/or recovering the cellulose in step (e) may be performed by adding at least one acidic compound, especially at least one mineral or inorganic acid, preferably sulfuric acid, and/or by contacting the cellulose xanthate, especially the slurry obtained in step (d), with at least one mineral or inorganic acid, preferably sulfuric acid.

Step (e) and/or the regeneration and/or recovery of the cellulose may be followed by the steps of washing or neutralizing, optionally plasticizing, optionally orienting (stretching) and drying the extruded film.

The regeneration and/or recovery of the cellulose in step (e) may be combined with an extrusion and/or extrusion step. Especially, the extrusion and/or extrusion step may be preceded by ripening, filtering and deaerating the cellulose xanthate, especially the slurry obtained in step (d). The extrusion and/or extrusion step may be followed by washing or neutralizing, optionally plasticizing, optionally orienting (stretching) and drying the extruded film.

Furthermore, according to a second aspect of the present invention, there is provided a cellulosic film (i.e. cellulose film), particularly a cellulosic food packaging film, especially a detectable cellulosic film, which cellulosic film comprises detectable particles incorporated therein, particularly in homogeneous distribution.

Further, according to this aspect of the present invention, there is provided a cellulosic film (i.e. cellulose film), particularly a cellulosic food packaging film, especially a detectable cellulosic film, which cellulosic film comprises detectable particles incorporated therein, particularly in homogeneous distribution, which cellulosic film is obtainable according to a manufacturing method as defined and described hereinabove.

The particularities and advantages of the inventive cellulosic film have already been described in detail in connection with the inventive manufacturing method, so that reference can be made to the above explanations in order to avoid unnecessary repetitions.

Typically, the cellulosic film comprising the detectable particles incorporated therein is based on regenerated cellulose, especially cellulose hydrate (cellophane).

The amounts or concentrations of detectable particles in the inventive cellulosic film may vary in broad ranges: Typically, the cellulosic film comprising the detectable particles incorporated therein comprises the detectable particles in amounts of from 0.1 to 50 wt. %, especially 0.2 to 40 wt. %, particularly 0.3 to 30 wt. %, preferably 0.5 to 20 wt. %/o, more preferably 0.8 to 10 wt. %, even more preferably 1 to 8 wt. %, based on the overall weight of the cellulosic film comprising the detectable particles incorporated therein.

Furthermore, according to a particular embodiment of the present invention, the cellulosic film comprising the detectable particles incorporated therein may further comprise at least one plasticizer. Especially, the plasticizer may be comprised in amounts of from 0.5 to 40 wt. %, especially 1 to 30 wt. %, particularly 2 to 25 wt. %, preferably 3 to 20 wt. %, more preferably 5 to 15 wt. %, of the plasticizer, based on the overall weight of the cellulosic film comprising the detectable particles incorporated therein. Especially, the plasticizer may be a food-compatible plasticizer and/or may be selected from the group consisting of polyols, especially glycerol (glycerine).

According to a particular embodiment of the present invention, the cellulosic film comprising the detectable particles incorporated therein may be a non-reinforced and/or non-supported and/or non-fibrous cellulosic film. Especially, the cellulosic film comprising the detectable particles incorporated therein may be a self-supporting cellulosic film.

Alternatively, according to another embodiment of the present invention, the cellulosic film comprising the detectable particles incorporated therein may be reinforced and/or supported, especially by a preferably fibrous substrate, particularly a paper, a web or a fabric. The cellulosic film comprising the detectable particles incorporated therein may be bonded, preferably by extrusion, to a fibrous substrate and/or support, particularly to a paper, a web or a fabric. The cellulosic film comprising the detectable particles incorporated therein may be a reinforced, preferably a fiber-reinforced or fibrous reinforced cellulosic film comprising the detectable particles incorporated therein.

According to a specific embodiment of the present invention, the cellulosic film comprising the detectable particles incorporated therein may be combined with, especially co-extruded and/or laminated with, at least one other film of same or different material, preferably of a different material made of a plastic.

According to a specific embodiment of the present invention, the cellulosic film comprising the detectable particles incorporated therein may be, on at least one of its both sides, combined with at least one other film of same or different material, preferably of a different material made of a plastic, preferably via co-extrusion or lamination.

As already delineated in connection with the inventive manufacturing method, the cellulosic film comprising the detectable particles incorporated therein may comprise and/or may be provided with, especially on at least one of its both sides, a film or coating having moisture and/or oxygen barrier properties, especially a polyvinylidene chloride (PVDC) film or coating.

According to yet another particular embodiment of the present invention, the cellulosic film comprising the detectable particles incorporated therein may comprise:

(i) cellulose, particularly regenerated cellulose, especially cellulose hydrate (cellophane), preferably in amounts of from 70 to 99.9 wt. %, especially 75 to 99 wt. %, particularly 75 to 98 wt. %, preferably 78 to 96 wt. %, more preferably 79 to 92 wt. %, even more preferably 80 to 90 wt. %, based on the overall weight of the cellulosic film comprising the detectable particles incorporated therein;

(ii) detectable particles, preferably in amounts of from 0.1 to 50 wt. %, especially 0.2 to 40 wt. %, particularly 0.3 to 30 wt. %, preferably 0.5 to 20 wt. %, more preferably 0.8 to 10 wt. %, even more preferably 1 to 8 wt. %, based on the overall weight of the cellulosic film comprising the detectable particles incorporated therein;

(iii) optionally, at least one plasticizer, especially a food-compatible plasticizer and/or a plasticizer selected from the group consisting of polyols, especially glycerol (glycerine), preferably in amounts of from 0.5 to 40 wt. %, especially 1 to 30 wt. %, particularly 2 to 25 wt. %, preferably 3 to 20 wt. %, more preferably 5 to 15 wt. %, of the plasticizer, based on the overall weight of the cellulosic film comprising the detectable particles incorporated therein.

It goes without saying that the skilled practitioner will combine and/or select the aforenamed weight indications such that 100 wt. % with result.

With respect to the detectable particles used in the inventive cellulosic film, the detectable particles may be magnetic, especially permanently magnetic, preferably ferromagnetic, ferrimagnetic or (super)paramagnetic.

The detectable particles may comprise or consist of at least one metal or metal oxide, especially iron (Fe) and/or cobalt (Co) and/or nickel (Ni) and/or their oxide(s), preferably oxide(s) of iron (Fe) and/or cobalt (Co) and/or nickel (Ni), more preferably oxide(s) of iron (Fe), especially in magnetic form.

The detectable particles may comprise or consist of at least one magnetic metal or metal oxide, especially iron (Fe) and/or cobalt (Co) and/or nickel (Ni) and/or their oxide(s), preferably oxide(s) of iron (Fe) and/or cobalt (Co) and/or nickel (Ni), more preferably oxide(s) of iron (Fe).

The detectable particles may comprise or consist of at least one magnetic iron oxide, especially selected from the group consisting of magnetite ($Fe_3O_4$), maghemite ($Fe_2O_3$), hematite ($Fe_2O_3$), ferrite, goethite (FeO(OH)), lepidocrocite (FeO(OH)) and ferroxyhyte (FeO(OH)) as well as mixtures and combinations thereof, preferably magnetite ($Fe_3O_4$).

The detectable particles used in the present invention may comprise iron (Fe) in weight-related amounts in the range of from 20 to 80 wt. %, especially 25 to 75 wt. %, based on the overall particle weight.

Furthermore, the detectable particles may comprise a weight-related specific saturation magnetization of at least 50 $Am^2$/kg iron (Fe), especially at least 70 $Am^2$/kg iron (Fe), particularly at least 80 $Am^2$/kg iron (Fe), preferably at least 90 $Am^2$/kg iron (Fe), more preferably at least 100 $Am^2$/kg iron (Fe), even more preferably at least 110 $Am^2$/kg iron (Fe).

The particle sizes of the detectable particles used in the present invention may vary within broad ranges.

According to a particular embodiment, the detectable particles may comprise absolute particles sizes, especially absolute particle diameters, in the range of from 0.01 to 1,000 micrometers, especially 0.05 to 750 micrometers, particularly 0.1 to 500 micrometers, preferably 0.2 to 400 micrometers, more preferably 0.2 to 300 micrometers, even more preferably 0.5 to 200 micrometers, most preferably 1 to 100 micrometers, especially determined via light scattering and/or laser diffraction, preferably according to standardized method pursuant to ISO 13320:2009.

Furthermore, the detectable particles may comprise mean (average) particle sizes D50, especially mean (average) particle diameters D50, in the range of from 0.05 to 500 micrometers, especially 0.1 to 250 micrometers, particularly 0.2 to 150 micrometers, preferably 0.5 to 100 micrometers, more preferably 0.8 to 75 micrometers, even more preferably 1 to 50 micrometers, most preferably 2 to 30 micrometers, especially determined via light scattering and/or laser diffraction, preferably according to standardized method pursuant to ISO 13320:2009.

Further, the detectable particles may comprise mean (average) particle sizes D100, especially mean (average) particle diameters D100, in the range of from 0.1 to 800 micrometers, especially 0.2 to 400 micrometers, particularly 0.5 to 200 micrometers, preferably 1 to 150 micrometers, more preferably 2 to 125 micrometers, even more preferably 3 to 110 micrometers, most preferably 5 to 100 micrometers, especially determined via light scattering and/or laser diffraction, preferably according to standardized method pursuant to ISO 13320:2009-10.

Furthermore, the detectable particles may comprise a density in the range of from 2 to 10 g/$cm^3$, especially 2.5 to 8 g/$cm^3$, particularly 3 to 7 g/$cm^3$, preferably 4 to 6 g/$cm^3$, more preferably 4.5 to 5.5 g/$cm^3$, preferably as determined according to standardized method pursuant to DIN EN ISO 1183-1:2013-04.

Further, the detectable particles may comprise an apparent density (bulk density) in the range of from 1 to 8 g/$cm^3$, especially 1.2 to 5 g/$cm^3$, particularly 1.3 to 4 g/$cm^3$, preferably 1.5 to 3 g/$cm^3$, preferably as determined according to standardized method pursuant to DIN EN ISO 60-1:2000-01.

According to a particular embodiment, the detectable particles and/or the cellulosic film of the present invention comprising the detectable particles incorporated therein is/are detectable by a metal detection device, especially a metal detector, and/or by an induction-based and/or magnetism-based and/or conductivity-based detection device and/or by an optically based device and/or by a photodetection device.

According to a particular and preferred embodiment of the present invention, the detectable particles used in the present invention may comprise a surface-modification, preferably protective against oxygen and/or against oxidation, especially an antioxidant and/or protective surface coating or surface encapsulation. The advantages and particularities linked to this specific embodiment have already been delineated hereinabove in the context of the inventive manufacturing method, so that reference can be made to the respective above explanations in order to avoid unnecessary repetitions.

According to this specific embodiment of the present invention, the surface-modification of the detectable particles may be hydrophobic.

Especially, the surface-modification may be bonded, especially chemically bonded, preferably covalently bonded, to the particle surfaces.

Especially, the surface-modification may comprise or consist of inorganic, organic or inorganic-organic polymers, especially selected from the group consisting of polysilanes, polysiloxanes, polyacrylates, polymethacrylates, polyacrylamides, starch-based polymers, cellulose-based polymers, polysaccharides, polyaminosaccharides and biopolymers as well as mixtures and combinations thereof, preferably polysilanes and polysiloxanes.

As delineated hereinbefore in connection with the inventive manufacturing method, the detectable particles are homogeneously distributed over and/or are homogeneously incorporated in the cellulosic film comprising the detectable particles incorporated therein. In other words, the cellulosic film comprising the detectable particles incorporated therein preferably comprises the detectable particles in homogeneous distribution and/or comprises the detectable particles incorporated therein in homogeneous distribution.

The detectable particles are permanently incorporated in and/or fixed (with)in and/or immobilized with(in) the cellulosic film comprising the detectable particles incorporated therein.

The inventive cellulosic film comprising the detectable particles incorporated therein is typically detectable by a metal detection device, especially a metal detector, and/or by an induction-based and/or magnetism-based and/or conductivity-based detection device and/or by an optically based device and/or by a photodetection device.

The cellulosic film of the present invention comprising the detectable particles incorporated therein may be in the form of a flat film, a sheet, a tubular film (tube), a casing or a bag.

Particularly, the inventive cellulosic film comprising the detectable particles incorporated therein may be flat (planar) or tubular, preferably tubular.

Especially, the inventive cellulosic film comprising the detectable particles incorporated therein may form and/or may be a tube, especially a seamless tube.

Furthermore, the inventive cellulosic film comprising the detectable particles incorporated therein may be a tubular film, preferably a seamless tubular film.

According to another particular embodiment of the present invention, the inventive cellulosic film comprising the detectable particles incorporated therein may form and/or may be a casing, especially a tubular casing, preferably a seamless tubular casing.

The inventive cellulosic film comprising the detectable particles incorporated therein may be shirred.

Particularly, the cellulosic film comprising the detectable particles incorporated therein may form and/or may be a shirred casing, especially a shirred tubular casing, preferably a shirred seamless tubular casing.

According to a particular embodiment of the present invention, the inventive cellulosic film comprising the detectable particles incorporated therein may be a monolayer or multilayer food packaging film, especially a monoaxially or biaxially oriented (stretched) monolayer or multilayer food packaging film.

According to yet another particular embodiment of the present invention, the cellulosic film comprising the detectable particles incorporated therein may be monoaxially or biaxially oriented (stretched), preferably biaxially oriented (stretched).

According to a specific embodiment of the present invention, the cellulosic film comprising the detectable particles incorporated therein is extruded and/or has been produced by extrusion.

Also the thickness of the inventive cellulosic film may vary within broad ranges:

Typically, the cellulosic film comprising the detectable particles incorporated therein may have an overall thickness in the range of from 1 to 2,000 micrometers, especially in the range of from 2 to 1,000 micrometers, preferably in the range of from 5 to 750 micrometers, more preferably in the range of from 10 to 500 micrometers, even more preferably in the range of from 20 to 250 micrometers.

Furthermore, the cellulosic film of the present invention comprising the detectable particles incorporated therein may have an overall thickness of at least 5 micrometers, especially of at least 10 micrometers, preferably of at least 15 micrometers, more preferably of at least 20 micrometers, even more preferably of at least 30 micrometers.

Furthermore, the cellulosic film of the present invention comprising the detectable particles incorporated therein may have an overall thickness of up to 5,000 micrometers, especially of up to 2,000 micrometers, preferably of up to 1,000 micrometers, more preferably of up to 750 micrometers, even more preferably of up to 500 micrometers.

The cellulosic film of the present invention possesses a multitude of excellent properties:

First, the cellulosic film comprising the detectable particles incorporated therein is permeable to water vapor and/or to smoke.

Furthermore, the cellulosic film comprising the detectable particles incorporated therein is impermeable to microorganisms and/or has barrier properties against microorganisms.

Furthermore, the cellulosic film comprising the detectable particles incorporated therein usually has a shrinkage value (shrinkability) of at least 20%, especially of at least 30%, preferably of at least 40%, at a temperature of 90° C. in the longitudinal and/or transverse direction, preferably both in the longitudinal and transverse directions, especially as determined according to ASTM D2732.

Moreover, the inventive cellulosic film comprising the detectable particles incorporated therein typically has a shrinkage value (shrinkability) in the range of from 10% to 70%, especially of from 20% to 60%, at a temperature of 90° C. in the longitudinal and/or transverse direction, preferably both in the longitudinal and transverse directions, especially as determined according to ASTM D2732, particularly determined as the unrestrained shrink at a temperature of 90° C. (water bath) for 10 seconds.

Further, the inventive cellulosic film comprising the detectable particles incorporated therein usually has a tensile strength in the longitudinal and/or transverse direction, preferably both in the longitudinal and transverse directions, in the range of from 15 to 100 MPa, especially in the range of from 20 to 80 MPa, especially as determined according to ASTM D-882, Method A.

Furthermore, the inventive cellulosic film comprising the detectable particles incorporated therein usually has an elongation at break in the longitudinal and/or transverse direction, preferably both in the longitudinal and transverse directions, in the range of from 20 to 300%, especially in the range of from 40 to 200%, especially as determined according to ASTM D-882, Method A.

Furthermore, the inventive cellulosic film comprising the detectable particles incorporated therein usually has a (tensile) modulus in the longitudinal and/or transverse direction, preferably both in the longitudinal and transverse directions, in the range of from 100 to 400 MPa, especially in the range of from 150 to 400 MPa, especially as determined from the respective tensile curve.

According to a particular embodiment of the present invention, the inventive cellulosic film comprising the detectable particles incorporated therein may comprise and/or may be provided with, especially on at least one of its both sides, at least one food additive. Especially, the at least one food additive may comprise a flavoring and/or coloring and/or odoring food additive, especially in the form of a preferably aqueous solution or dispersion, particularly a liquid smoke or caramel. Especially, the cellulosic film is capable of reversibly retaining and/or absorbing the at least one food additive and to again release and/or transfer the retained and/or absorbed food additive to a foodstuff encased therein or therewith, especially when the encased foodstuff is subjected to cooking and/or processing.

With respect to further details as to the second aspect of the present invention, reference may be made to the above description of the first aspect of the present invention, which also applies as to the second aspect of the present invention accordingly.

Moreover, according to a third aspect of the present invention, the present invention also relates to the use of an inventive cellulosic film as described hereinbefore for packaging and/or processing and/or producing foodstuff.

According to this aspect of the present invention, the inventive detectable cellulosic film may be used in an industrial and/or automated packaging and/or processing and/or production line equipped with at least one metal detection device, especially a metal detector, and/or at least one induction-based and/or magnetism-based and/or conductivity-based detection device and/or at least one optically based device and/or at least one photodetection device.

With respect to further details as to the third aspect of the present invention, reference may be made to the above explanations as to the other inventive aspects, which apply accordingly also to the third aspect of the present invention.

Further, according to a fourth aspect of the present invention, the present invention also refers to the use of an inventive cellulosic film as described hereinbefore for enhancing and/or improving food safety and/or food security, especially in packaging and/or processing and/or producing foodstuff.

With respect to further details as to the fourth aspect of the present invention, reference may be made to the above explanations as to the other inventive aspects, which apply accordingly also to the fourth aspect of the present invention.

Furthermore, according to a fifth aspect of the present invention, the present invention also relates to the use of an inventive cellulosic film as described hereinbefore for detecting undesired residues or remainders of the inventive cellulosic film on foodstuff surfaces and/or within or inside foodstuff.

With respect to further details as to the fifth aspect of the present invention, reference may be made to the above explanations as to the other inventive aspects, which apply accordingly also to the fifth aspect of the present invention.

Also, according to a sixth aspect of the present invention, the present invention also refers to the use of an inventive cellulosic film as described hereinbefore for detecting undesired residues or remainders of the inventive cellulosic film in industrial and/or automated packaging and/or processing and/or production processes.

With respect to further details as to the sixth aspect of the present invention, reference may be made to the above explanations as to the other inventive aspects, which apply accordingly also to the sixth aspect of the present invention.

Furthermore, according to a seventh aspect of the present invention, the present invention also refers to the use of an inventive cellulosic film as described hereinbefore for packaging and/or processing and/or producing medical devices and articles or pharmaceuticals.

With respect to further details as to the seventh aspect of the present invention, reference may be made to the above explanations as to the other inventive aspects, which apply accordingly also to the seventh aspect of the present invention.

Further, according to an eighth aspect of the present invention, the present invention relates to the use of an inventive cellulosic film as described hereinbefore for enhancing and/or improving safety and/or security in packaging and/or processing and/or producing medical devices and articles or pharmaceuticals.

With respect to further details as to the eighth aspect of the present invention, reference may be made to the above explanations as to the other inventive aspects, which apply accordingly also to the eighth aspect of the present invention.

Moreover, according to a ninth aspect of the present invention, the present invention refers to a foodstuff article packaged in an inventive cellulosic film as described hereinbefore.

With respect to further details as to the ninth aspect of the present invention, reference may be made to the above explanations as to the other inventive aspects, which apply accordingly also to the ninth aspect of the present invention.

Moreover, according to a tenth aspect of the present invention, the present invention also relates to a medical device or article or a pharmaceutical packaged in an inventive cellulosic film as described hereinbefore.

With respect to further details as to the tenth aspect of the present invention, reference may be made to the above explanations as to the other inventive aspects, which apply accordingly also to the tenth aspect of the present invention.

Also, according to an eleventh aspect of the present invention, the present invention relates to a method for providing a method of providing a cellulosic food packaging film with detection properties and/or detectability, especially with detection properties and/or detectability via a metal detection device, especially a metal detector, and/or via an induction-based and/or magnetism-based and/or conductivity-based detection device and/or via an optically based device and/or via a photodetection device, wherein said method comprises incorporating detectable particles in and/or into the cellulosic food packaging film.

According to this inventive aspect, the method comprises introducing and/or adding detectable particles into a solution or dispersion comprising cellulose and/or a cellulose precursor or derivative, followed by regenerating and/or recovering cellulose from the solution or dispersion in the presence of the detectable particles, so as to obtain a cellulosic film, particularly a cellulosic food packing film, comprising the detectable particles incorporated therein, particularly in homogeneous distribution.

With respect to further details as to the eleventh aspect of the present invention, reference may be made to the above explanations as to the other inventive aspects, which apply accordingly also to the eleventh aspect of the present invention.

Finally, according to an twelfth aspect of the present invention, the present invention also refers to the use of detectable particles for providing a cellulosic food packaging film with detection properties and/or detectability, especially with detection properties and/or detectability via a metal detection device, especially a metal detector, and/or via an induction-based and/or magnetism-based and/or conductivity-based detection device and/or via an optically based device and/or via a photodetection device, wherein detectable particles are incorporated in and/or into the cellulosic food packaging film.

According to this aspect of the present invention, the detectable particles are introduced and/or added into a solution or dispersion comprising cellulose and/or a cellulose precursor or derivative, followed by regenerating and/or recovering cellulose from the solution or dispersion in the presence of the detectable particles, so as to obtain a cellulosic film, particularly a cellulosic food packing film, comprising the detectable particles incorporated therein, particularly in homogeneous distribution.

With respect to further details as to the twelfth aspect of the present invention, reference may be made to the above explanations as to the other inventive aspects, which apply accordingly also to the twelfth aspect of the present invention.

Hereinafter, the present invention will be elucidated in more detail using preferred embodiments and figures. In connection with the elucidation of these preferred embodiments, which are, however, in no way restrictive as to the present invention, further advantages, particularities, properties, aspects and features of the present invention are also shown.

Figure 2:
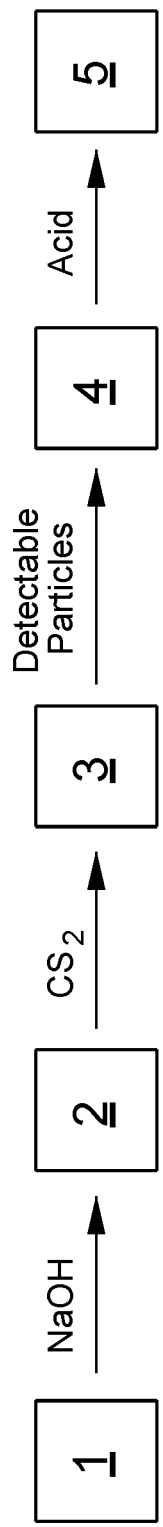
FIG. 2 shows a schematic sequence of the inventive manufacturing method according to a particular embodiment.
Figure 3:
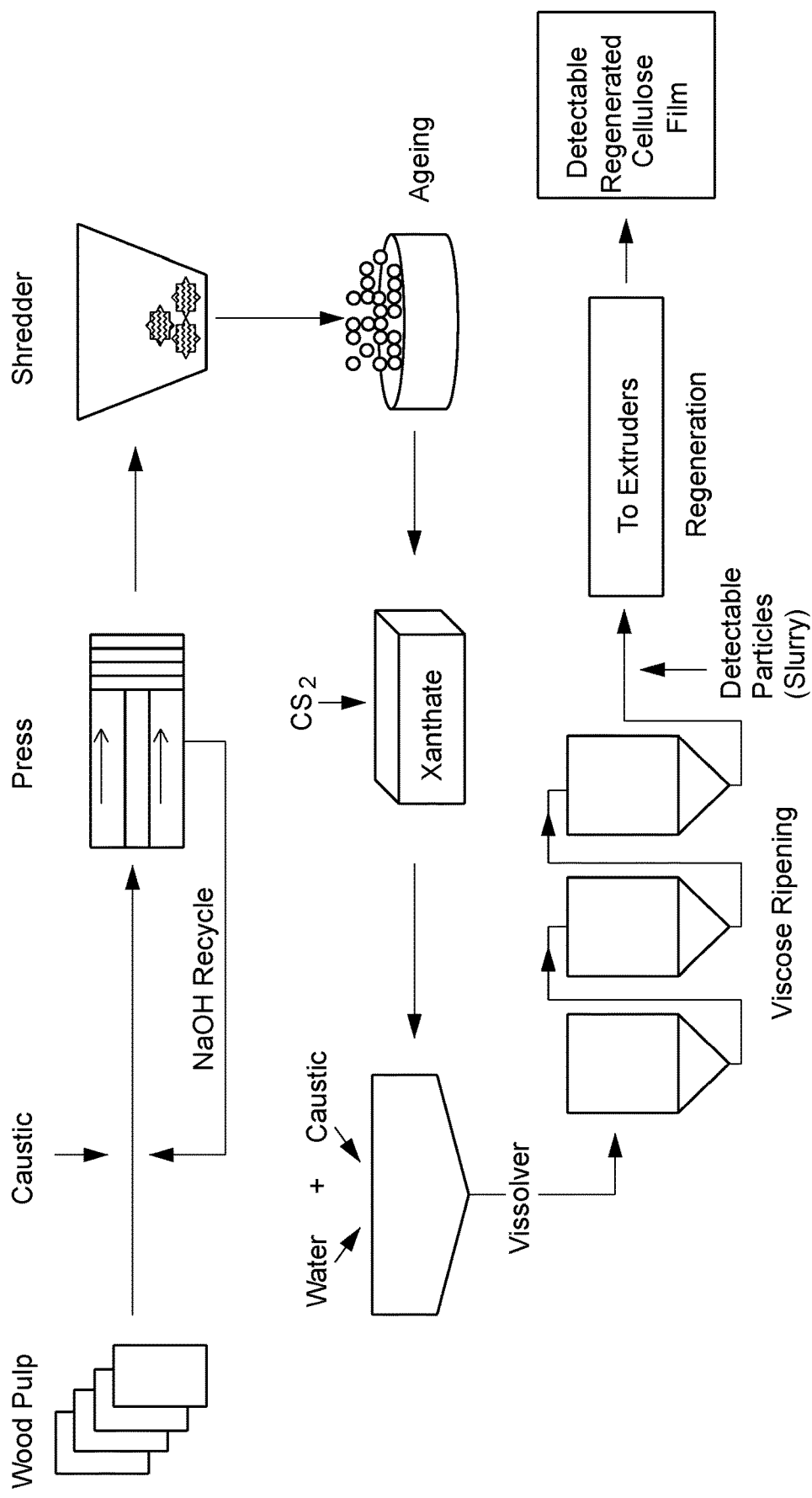
FIG. 3 shows an exemplary and schematic sequence of the inventive manufacturing method according to another particular embodiment.

In the figures:

FIG. 1 shows a schematic cross-sectional view of an inventive cellulosic film (i.e. cellulose film), particularly a cellulosic food packaging film, comprising detectable particles incorporated therein according to a particular embodiment;

FIG. 2 shows a schematic sequence of the inventive manufacturing method according to a particular embodiment;

FIG. 3 shows an exemplary and schematic sequence of the inventive manufacturing method according to another particular embodiment.

FIG. 1 shows a schematic cross-sectional view of an inventive cellulosic film (i.e. cellulose film) A, particularly a cellulosic food packaging film, comprising detectable particles C incorporated in the cellulosic base film B. By the incorporation of the detectable particles C the whole inventive cellulosic film A is detectable. As shown in FIG. 1, the detectable particles C are comprised by the inventive cellulosic film A in homogeneous distribution.

FIG. 2 shows a schematic sequence of the inventive manufacturing method according to a particular embodiment. In a first stage or step 1, a natural cellulose source (e.g. a wood pulp or cotton linters) is provided. In a second stage or step 2, the natural cellulose source has been contacted with a caustic solution (NaOH), usually followed by shredding and ageing, so as to result a shredded and aged alkali cellulose. In a subsequent stage or step 3, the alkali cellulose is then contacted with carbon disulfide ($CS_2$), so as to obtain a cellulose xanthate, especially a cellulose xanthate in a caustic solution. In a subsequent stage or step 4, detectable particles are introduced and/or added to the cellulose xanthate, especially to the caustic solution of the cellulose xanthate, so as to obtain a slurry comprising the cellulose xanthate and the detectable particles. In a final subsequent step 5, cellulose is regenerated and/or recovered from the cellulose xanthate in the presence of the detectable particles, so as to obtain a cellulosic film of the present invention comprising the detectable particles incorporated therein in homogeneous distribution.

Finally, FIG. 3 shows an exemplary and schematic sequence of the inventive manufacturing method according to another particular embodiment, as described hereinbefore. The natural cellulose source (wood pulp) provided is treated with a caustic solution (NaOH), including NaOH recycling, followed by shredding and ageing, so as to result a shredded and aged alkali cellulose, which is then treated with carbon disulfide ($CS_2$) and then with an aqueous caustic solution, so as to obtain a cellulose xanthate in a caustic solution, followed by ripening and usually also filtering and deaerating, which is then contacted with a slurry of detectable particles, before the cellulose is finally regenerated and recovered from the cellulose xanthate in the presence of the detectable particles, so that an inventive cellulosic film comprising the detectable particles incorporated therein is obtained. According to the embodiment shown in FIG. 3, regenerating and recovering the cellulose is combined with an extrusion and/or extrusion step.

As it has been shown hereinabove, the present invention, for the first time, provides an efficient and economic method of manufacturing a cellulosic film (cellulose film), particularly a cellulosic food packaging film, especially a detectable cellulosic film, which cellulosic film comprises detectable particles incorporated therein as well as the cellulosic film thus obtained.

The inventive method as well as the inventive cellulosic film lead to a multitude of particularities and advantages, which have been described hereinabove in detail. This allows for a multitude of new applications and usages of the inventive film and of the present invention as a whole.

Further embodiments, configurations, adaptations, variations, modifications, peculiarities, particularities and advantages of the present invention are immediately apparent to and implementable by the person skilled in the art on reading or studying the present application, without leaving the realm of the present invention.

The present invention will be illustrated, in the following, by the various examples which will described hereinbelow but which are not at all intended to restrict the present invention in any way.

EXAMPLES

General Description of the Manufacturing Method for the Examples

All cellulosic films are produced according to a manufacturing method as schematically shown in FIGS. 1 and 2 and as described hereinabove.

As detectable particles in the sense of the present invention, commercially available magnetic iron oxide powder on the basis of magnetite ($Fe_3O_4$) is used (density: 5.2 g/cm$^3$; bulk density: 1.9 g/cm$^3$; particle size D10: 5 μm, particle size D50: 16 μm, particle size D100: 80 μm). Both detectable particles without surface-modification and with surface-modification (i.e. hydrophobic surface-modification on the basis of polysiloxanes) are tested.

The detectable particles are used in the form of aqueous dispersions (i.e. water-based slurry of detectable particles together with a dispersant/dispersing agent on the basis of naphthalenesulfonic acid-formaldehyde condensate and also with a rheology modifier on the basis of carboxymethyl cellulose CMC).

Varying concentrations and amounts of detectable particles are used as indicated hereinbelow.

Manufacture of the detectable cellulosic films is performed according to the so-called viscose production process.

A wood pulp is used as a natural cellulose source and treated with a caustic solution, followed by shredding and ageing, so as to result a shredded and aged alkali cellulose, which is then reacted with carbon disulfide ($CS_2$), so as to obtain a cellulose xanthate in a caustic solution. Then, a slurry of the detectable particles in water together with dispersant and the rheology modifier is introduced into the caustic cellulose xanthate solution, so as to obtain a slurry comprising the caustic solution of the cellulose xanthate and the detectable particles, followed by regeneration and recovering the cellulose from the cellulose xanthate in the presence of the detectable particles by addition of sulfuric acid upon extrusion at the same time, followed by the steps of washing and neutralizing, plasticizing with glycerine, orienting (stretching) and drying the extruded film. Extrusion operation is preceded by ripening, filtering and deaerating the slurry of cellulose xanthate prior to adding the slurry of the detectable particles.

Detectable cellulosic films comprising the detectable particles incorporated therein are obtained as the final product, which films are then tested for detectability. All films are produced in the form of tubular casings produced by extrusion using an annular die, which are grey in color due to the presence of the iron oxide particles.

| Slurry compositions of detectable particles used and produced films | | |
|---|---|---|
| Slurry No. 1 | wt. % | grams |
| Magnetic $Fe_3O_4$ particles (magnetite) without surface modification | 19.74 | 800 |
| Dispersant (dispersing agent) | 0.79 | 32 |
| Rheology modifier | 0.49 | 20 |
| Water | 78.98 | 3,200 |
| TOTAL | 100.00 | 4,052 |

| Film No. 1 | | Film No. 1 | |
|---|---|---|---|
| Cellulose | 85.56 wt. % | Cellulose | 100.00 wt. % |
| $Fe_3O_4$ | 2.55 wt. % | $Fe_3O_4$ | 2.98 wt. % |
| Glycerine | 11.89 wt. % | (Percentage in weight based on the bone dry cellulose) | |
| TOTAL | 100.00 wt. % | | |
| (percentage in weight based on the dry casing; i.e. dry casing = cellulose + glycerine + $Fe_3O_4$) | | | |

-continued

Slurry compositions of detectable particles used and produced films

| Slurry No. 2 | wt. % | grams |
|---|---|---|
| Magnetic $Fe_3O_4$ particles (magnetite) with surface modification | 19.74 | 800 |
| Dispersant (dispersing agent) | 0.79 | 32 |
| Rheology modifier | 0.49 | 20 |
| Water | 78.98 | 3,200 |
| TOTAL | 100.00 | 4,052 |

| Film No. 2 | | Film No. 2 | |
|---|---|---|---|
| Cellulose | 85.56 wt. % | Cellulose | 100.00 wt. % |
| $Fe_3O_4$ | 2.55 wt. % | $Fe_3O_4$ | 2.98 wt. % |
| Glycerine | 11.89 wt. % | (Percentage in weight based | |
| TOTAL | 100.00 wt. % | on the bone dry cellulose) | |
| (percentage in weight based on the dry casing; i.e. dry casing = cellulose + glycerine + $Fe_3O_4$) | | | |

| Slurry No. 3 | wt. % | grams |
|---|---|---|
| Magnetic $Fe_3O_4$ particles (magnetite) without surface modification | 19.74 | 800 |
| Dispersant (dispersing agent) | 0.79 | 32 |
| Rheology modifier | 0.49 | 20 |
| Water | 78.98 | 3,200 |
| TOTAL | 100.00 | 4,052 |

| Film No. 3 | | Film No. 3 | |
|---|---|---|---|
| Cellulose | 84.29 wt. % | Cellulose | 100.00 wt. % |
| $Fe_3O_4$ | 3.82 wt. % | $Fe_3O_4$ | 4.53 wt. % |
| Glycerine | 11.89 wt. % | (Percentage in weight based | |
| TOTAL | 100.00 wt. % | on the bone dry cellulose) | |
| (percentage in weight based on the dry casing; i.e. dry casing = cellulose + glycerine + $Fe_3O_4$) | | | |

| Slurry No. 4 | wt. % | grams |
|---|---|---|
| Magnetic $Fe_3O_4$ particles (magnetite) with surface modification | 19.74 | 800 |
| Dispersant (dispersing agent) | 0.79 | 32 |
| Rheology modifier | 0.49 | 20 |
| Water | 78.98 | 3,200 |
| TOTAL | 100.00 | 4,052 |

| Film No. 4 | | Film No. 4 | |
|---|---|---|---|
| Cellulose | 84.29 wt. % | Cellulose | 100.00 wt. % |
| $Fe_3O_4$ | 3.82 wt. % | $Fe_3O_4$ | 4.53 wt. % |
| Glycerine | 11.89 wt. % | (Percentage in weight based | |
| TOTAL | 100.00 wt. % | on the bone dry cellulose) | |
| (percentage in weight based on the dry casing; i.e. dry casing = cellulose + glycerine + $Fe_3O_4$) | | | |

| Slurry No. 5 | wt. % | grams |
|---|---|---|
| Magnetic $Fe_3O_4$ particles (magnetite) without surface modification | 33.80 | 1,370 |
| Dispersant (dispersing agent) | 0.79 | 32 |
| Rheology modifier | 0.49 | 20 |
| Water | 64.90 | 2,630 |
| TOTAL | 100.00 | 4,052 |

| Film No. 5 | | Film No. 5 | |
|---|---|---|---|
| Cellulose | 82.65 wt. % | Cellulose | 100.00 wt. % |
| $Fe_3O_4$ | 5.46 wt. % | $Fe_3O_4$ | 6.60 wt. % |
| Glycerine | 11.89 wt. % | (Percentage in weight based | |
| TOTAL | 100.00 wt. % | on the bone dry cellulose) | |
| (percentage in weight based on the dry casing; i.e. dry casing = cellulose + glycerine + $Fe_3O_4$) | | | |

| Slurry No. 6 | wt. % | grams |
|---|---|---|
| Magnetic $Fe_3O_4$ particles (magnetite) with surface modification | 33.80 | 1,370 |
| Dispersant (dispersing agent) | 0.79 | 32 |
| Rheology modifier | 0.49 | 20 |
| Water | 64.90 | 2,630 |
| TOTAL | 100.00 | 4,052 |

| Film No. 6 | | Film No. 6 | |
|---|---|---|---|
| Cellulose | 82.65 wt. % | Cellulose | 100.00 wt. % |
| $Fe_3O_4$ | 5.46 wt. % | $Fe_3O_4$ | 6.60 wt. % |
| Glycerine | 11.89 wt. % | (Percentage in weight based | |
| TOTAL | 100.00 wt. % | on the bone dry cellulose) | |
| (percentage in weight based on the dry casing; i.e. dry casing = cellulose + glycerine + $Fe_3O_4$) | | | |

| Slurry No. 7 | wt. % | grams |
|---|---|---|
| Magnetic $Fe_3O_4$ particles (magnetite) without surface modification | 33.80 | 1,370 |
| Dispersant (dispersing agent) | 0.79 | 32 |
| Rheology modifier | 0.49 | 20 |
| Water | 64.90 | 2,630 |
| TOTAL | 100.00 | 4,052 |

| Film No. 7 | | Film No. 7 | |
|---|---|---|---|
| Cellulose | 81.56 wt. % | Cellulose | 100.00 wt. % |
| $Fe_3O_4$ | 6.55 wt. % | $Fe_3O_4$ | 8.02 wt. % |
| Glycerine | 11.89 wt. % | (Percentage in weight based | |
| TOTAL | 100.00 wt. % | on the bone dry cellulose) | |
| (percentage in weight based on the dry casing; i.e. dry casing = cellulose + glycerine + $Fe_3O_4$) | | | |

| Slurry No. 8 | wt. % | grams |
|---|---|---|
| Magnetic $Fe_3O_4$ particles (magnetite) with surface modification | 33.80 | 1,370 |
| Dispersant (dispersing agent) | 0.79 | 32 |
| Rheology modifier | 0.49 | 20 |
| Water | 64.90 | 2,630 |
| TOTAL | 100.00 | 4,052 |

| Film No. 8 | | Film No. 8 | |
|---|---|---|---|
| Cellulose | 81.56 wt. % | Cellulose | 100.00 wt. % |
| $Fe_3O_4$ | 6.55 wt. % | $Fe_3O_4$ | 8.02 wt. % |
| Glycerine | 11.89 wt. % | (Percentage in weight based | |
| TOTAL | 100.00 wt. % | on the bone dry cellulose) | |
| (percentage in weight based on the dry casing; i.e. dry casing = cellulose + glycerine + $Fe_3O_4$) | | | |

Description of the Testing Results

All tubular casings are tested in food processing, especially stuffing with meat, and smoking and/or cooking treatment, followed by unpeeling the casings.

All detectable casings show the usual properties of cellulosic casings without being affected by the presence of the detectable particles. However, in addition (i.e. unlike usual cellulosic casings), all casings are detectable to a magnetic field, i.e. all tubular casings have magnetic properties.

In an automated industrial production line for hot dogs, comprising a metal detector of the type Mettler-Toledo Safeline, pieces of varying size of the inventive films are positioned both onto the foodstuff surfaces and also even inside the foodstuff.

Film pieces of about 2.3 cm×2.7 cm in size could be easily detected both on the foodstuff surface and also even inside the foodstuff surface. The same applies even to film pieces of the inventive films of 1 cm×1.2 cm size. Even smaller pieces of the inventive films of 0.5 cm×0.7 cm size can still be detected during automated industrial run of the hot dog production.

Best testing results are obtained with the surface-modified detectable particles since they give the strongest signal. Nevertheless, also films produced using the non-surface-modified detectable particles are still detectable.

TABLE 1

Detectability properties of the various films

| Film No. | Detectability at film piece size 2.3 cm × 2.7 cm | | Detectability at film piece size 1 cm × 1.2 cm | | Detectability at film piece size 0.5 × 0.7 cm | |
|---|---|---|---|---|---|---|
| | on foodstuff surface | inside foodstuff | on foodstuff surface | inside foodstuff | on foodstuff surface | inside foodstuff |
| 1 | +++ | ++ | ++ | + | ++ | n.d. |
| 2* | +++ | +++ | +++ | ++ | ++ | + |
| 3 | ++++ | +++ | +++ | ++ | ++ | + |
| 4* | ++++ | ++++ | ++++ | +++ | +++ | ++ |
| 5 | ++++ | ++++ | ++++ | +++ | +++ | ++ |
| 6* | ++++ | ++++ | ++++ | ++++ | +++ | +++ |
| 7 | ++++ | ++++ | ++++ | ++++ | ++++ | +++ |
| 8* | ++++ | ++++ | ++++ | ++++ | ++++ | ++++ |

*Films comprising detectable particles with surface-modification
detectability: ++++ excellent, +++ very good, ++ good, + acceptable
n.d. = not determined In further test series, test pieces of the inventive films may also be detected via an optically based device or a photodetection device. For, the detectable particles used according to the present invention create also an unknown and unusual opacity of the films into which they are incorporated, i.e. different from that obtainable e.g. with usual carbon black pigments at the same level of addition. Especially, the detectable particles used according to the present invention are exceedingly black (and not the gray color obtained with carbon black at the same loading), so this effect is photosensitive enough for optical detection or photodetection, respectively.

The invention claimed is:

1. A detectable cellulosic food packaging film,
   wherein the detectable cellulosic food packaging film is made of at least one of a regenerated cellulose and a cellulose hydrate and comprises detectable particles incorporated therein in a homogeneous distribution;
   wherein the detectable particles:
     are magnetic,
     are detectable by a metal detection device,
     comprise at least one magnetic iron oxide selected from the group consisting of magnetite ($Fe_3O_4$), maghemite ($Fe_2O_3$), hematite ($Fe_2O_3$), ferrite, goethite (FeO(OH)), lepidocrocite (FeO(OH)) and ferroxyhyte (FeO(OH)) as well as mixtures and combinations thereof, and
     comprise a weight-related specific saturation magnetization of at least 50 $Am^2$/kg iron (Fe);
   wherein the detectable particles comprise a hydrophobic surface-modification protective against oxygen and oxidation, wherein the surface-modification is bonded to the particle surfaces of the detectable particles and comprises inorganic, organic or inorganic-organic polymers selected from the group consisting of polysilanes, polysiloxanes, polyacrylates, polymethacrylates, polyacrylamides, starch-based polymers, cellulose-based polymers, polysaccharides, polyaminosaccharides and biopolymers as well as mixtures and combinations thereof; and
   wherein the cellulosic food packaging film comprises:
     (i) the at least one of regenerated cellulose and cellulose hydrate in amounts of from 70 to 99.4 wt. %, based on the overall weight of the cellulosic food packaging film comprising the detectable particles incorporated therein;
     (ii) the detectable particles in amounts of from 0.1 to about 30 wt. %, based on the overall weight of the cellulosic food packaging film comprising the detectable particles incorporated therein;
     (iii) at least one food-compatible plasticizer comprising a polyol and in amounts of from 0.5 to about 30 wt. %, based on the overall weight of the cellulosic film comprising the detectable particles incorporated therein;
     (iv) at least trace amounts of at least one dispersant selected from the group consisting of arylsulfonic acids-formaldehyde condensates; and
     (v) at least trace amounts of at least one rheology modifier, wherein the at least one rheology modifier is a cellulose derivative selected from the group consisting of carboxymethyl cellulose (CMC), methyl ethyl cellulose, hydroxypropyl methyl cellulose, hydroxypropyl cellulose, methyl cellulose, ethyl cellulose, cellulose powder, microcrystalline cellulose, and mixtures and combinations of any of the foregoing.

2. A detectable cellulosic food packaging film,
wherein the detectable cellulosic food packaging film is made of at least one of a regenerated cellulose and a cellulose hydrate and comprises detectable particles incorporated therein in a homogeneous distribution,
wherein the detectable particles:
are magnetic,
are detectable by a metal detection device,
comprise at least one magnetic iron oxide selected from the group consisting of magnetite ($Fe_3O_4$), maghemite ($Fe_2O_3$), hematite ($Fe_2O_3$), ferrite, goethite (FeO(OH)), lepidocrocite (FeO(OH)) and ferroxyhyte (FeO(OH)) as well as mixtures and combinations thereof, and
comprise a weight-related specific saturation magnetization of at least 50 $Am^2$/kg iron (Fe); and
wherein the cellulosic food packaging film comprises:
(i) the at least one of regenerated cellulose and cellulose hydrate in amounts of from 70 to 99.4 wt. %, based on the overall weight of the cellulosic food packaging film comprising the detectable particles incorporated therein;
(ii) the detectable particles in amounts of from 0.1 to about 30 wt. %, based on the overall weight of the cellulosic food packaging film comprising the detectable particles incorporated therein;
(iii) at least one food-compatible plasticizer comprising a polyol and in amounts of from 0.5 to about 30 wt. %, based on the overall weight of the cellulosic film comprising the detectable particles incorporated therein;
(iv) at least trace amounts of at least one dispersant selected from the group consisting of arylsulfonic acids-formaldehyde condensates; and
(v) at least trace amounts of at least one rheology modifier selected from the group consisting of cellulose esters and cellulose ethers.

3. A detectable cellulosic food packaging film,
wherein the detectable cellulosic food packaging film is made of at least one of a regenerated cellulose and a cellulose hydrate and comprises detectable particles incorporated therein in a homogeneous distribution;
wherein the detectable particles:
are magnetic,
are detectable by a metal detection device,
comprise at least one magnetic iron oxide selected from the group consisting of magnetite ($Fe_3O_4$), maghemite ($Fe_2O_3$), hematite ($Fe_2O_3$), ferrite, goethite (FeO(OH)), lepidocrocite (FeO(OH)) and ferroxyhyte (FeO(OH)) as well as mixtures and combinations thereof, and
comprise a weight-related specific saturation magnetization of at least 50 $Am^2$/kg iron (Fe); and
wherein the film has been obtained by a method comprising the following steps:
(i) a first step of introducing detectable particles into a solution or dispersion comprising at least one of a cellulose and a cellulose precursor or derivative in the presence of:
at least one dispersant comprising a naphthalenesulfonic acid-formaldehyde condensate or a neutral salt thereof; and
at least one rheology modifier selected from the group consisting of (i) carboxymethyl cellulose (CMC), methyl ethyl cellulose, hydroxypropyl methyl cellulose, hydroxypropyl cellulose, methyl cellulose, ethyl cellulose, cellulose powder, and microcrystalline cellulose; (ii) organic polymers selected from the group consisting of polyvinyl alcohols, polyacrylic acids and their salts, polyacrylates, polymethacrylic acids and their salts, polymethacrylates, polyacrylamides, polyvinylpyrrolidones, and polyalkylene glycols; (iii) alginic acids and their salts, ethers, and esters; (iv) agar (agar-agar); (v) carrageenans; (vi) ceratonia siliqua gums (locust bean gums); (vii) galactomannans; (viii) tragacanth gums; (ix) gum Arabic; (x) xanthan gums; (xi) gellan gums; (xii) polysaccharides and polysaccharide derivatives; and (xiii) mixtures and combinations of any of the foregoing; and
(ii) followed by a second step of regenerating and recovering cellulose from the solution or dispersion in the presence of the detectable particles, so as to obtain the detectable cellulosic food packaging film comprising the detectable particles incorporated therein in homogeneous distribution.

4. The film as defined in claim 3:
wherein the detectable particles comprise iron (Fe) in weight-related amounts in the range of from 20 to 80 wt. %, based on the overall particle weight.

5. The film as defined in claim 3:
wherein the detectable particles comprise absolute particle sizes in the range of from 0.01 to 1,000 micrometers.

6. The film as defined in claim 3:
wherein the detectable cellulosic food packaging film comprises the detectable particles in amounts of from 0.1 to 50 wt. %, based on the overall weight of the cellulosic film comprising the detectable particles incorporated therein.

7. The film as defined in claim 3:
wherein the detectable cellulosic food packaging film comprises the detectable particles in amounts of from 0.1 to 20 wt. %, based on the overall cellulosic film weight.

8. The film as defined in claim 3:
wherein the detectable cellulosic food packaging film is in the form of a flat film, a sheet, a tubular film, a casing or a bag.

9. The film as defined in claim 3:
wherein the detectable cellulosic food packaging film is flat or tubular.

10. The film as defined in claim 3:
wherein the detectable cellulosic food packaging film forms a seamless tube.

11. The film as defined in claim 3:
wherein the detectable cellulosic food packaging film forms a seamless tubular casing.

12. A foodstuff article packaged in a detectable cellulosic food packaging film as defined in claim 3.

13. A method of manufacturing the detectable cellulosic food packaging film of claim 3,
wherein the method comprises the following steps:
(i) the first step of introducing the detectable particles into the solution or dispersion comprising the at least one of the cellulose and the cellulose precursor or the derivative in the presence of the at least one dispersant and the at least one rheology modifier; and
(ii) followed by the second step of regenerating and recovering the cellulose from the solution or dispersion in the presence of the detectable particles, so as to obtain the detectable cellulosic food packaging film comprising the detectable particles incorporated therein in the homogeneous distribution.

14. The method as defined in claim 13,
wherein the at least one dispersant has a number-average molecular weight of at least 500 g/mol and up to 1,000,000, g/mol.

15. The method as defined in claim 13,
wherein the at least one dispersant is the neutral salt of the naphthalenesulfonic acid-formaldehyde condensate.

16. The method as defined in claim 13,
wherein the at least one dispersant is used in amounts, calculated as the weight ratio of detectable particles dispersant, in the range of from 2,000:1 to 1:1.

17. The method as defined in claim 13,
wherein the at least one rheology modifier is selected from among the cellulose esters and the cellulose ethers.

18. The method as defined in claim 13,
wherein the detectable particles are introduced in the form of a dispersion wherein the dispersion comprises the detectable particles in amounts of from 0.5 to 80 wt. % based on the dispersion.

19. The method as defined in claim 13,
wherein the detectable particles comprise iron (Fe) in weight-related amounts in the range of from 20 to 80 wt. %, based on the overall particle weight.

20. The method as defined in claim 13,
wherein the detectable particles comprise absolute particle sizes in the range of from 0.01 to 1,000 micrometers.

21. The method as defined in claim 13,
wherein the detectable particles are used in such amounts that the resulting cellulosic film comprising the detectable particles incorporated therein comprises 0.1 to 50 wt. % of the detectable particles, based on the overall weight of the cellulosic film comprising the detectable particles incorporated therein.

22. The method as defined in claim 13,
wherein the cellulosic film comprising the detectable particles incorporated therein comprises 0.1 to 20 wt. % of the detectable particles, based on the overall cellulosic film weight.

23. The method as defined in claim 13,
wherein the regeneration and recovery of the cellulose is combined with an extrusion step.

24. The method as defined in claim 13,
wherein the slurry resulting from introducing the detectable particles into the solution or dispersion comprising at least one of a cellulose and a cellulose precursor or derivative is subjected to an extrusion process during or combined with the regeneration and recovery of the cellulose, wherein the slurry is extruded into at least one regeneration bath comprising a chemical required to regenerate and recover the cellulose, comprising precipitating the cellulose or to convert and react the cellulose precursor or derivative to cellulose, so as to obtain an extrudate comprising one of a regenerated cellulose and cellulose hydrate.

\* \* \* \* \*

UNITED STATES PATENT AND TRADEMARK OFFICE
CERTIFICATE OF CORRECTION

PATENT NO. : 11,499,024 B2
APPLICATION NO. : 16/339181
DATED : November 15, 2022
INVENTOR(S) : Myron D. Nicholson and Francois Bargeot It is certified that error appears in the above-identified patent and that said Letters Patent is hereby corrected as shown below:

In the Specification
        Column 17,    Line 36,    change "wt. %/o," to --wt. %,--

In the Claims
    Claim 14,    Column 33,    Line 6,    change "1,000,000, g/mol" to --1,000,000 g/mol--
    Claim 16,    Column 33,    Lines 12-13,    change "particles dispersant" to --particles:dispersant--

Signed and Sealed this
Eleventh Day of July, 2023

Katherine Kelly Vidal
*Director of the United States Patent and Trademark Office*